(12) United States Patent
Fujil

(10) Patent No.: US 7,302,238 B2
(45) Date of Patent: Nov. 27, 2007

(54) TRANSMIT DIVERSITY SYSTEM, METHOD AND COMPUTER PROGRAM PRODUCT

(75) Inventor: Masaaki Fujil, Yokohama (JP)

(73) Assignee: Samsung Electronics Co., Ltd. (KR)

( * ) Notice: Subject to any disclaimer, the term of this patent is extended or adjusted under 35 U.S.C. 154(b) by 749 days.

(21) Appl. No.: 10/829,796

(22) Filed: Apr. 22, 2004

(65) Prior Publication Data

US 2004/0213187 A1    Oct. 28, 2004

(30) Foreign Application Priority Data

| Apr. 25, 2003 | (JP) | ............................ 2003-121788 |
| Jun. 17, 2003 | (JP) | ............................ 2003-172187 |
| Mar. 24, 2004 | (KR) | .................... 10-2004-0019969 |

(51) Int. Cl.
*H03C 7/02* (2006.01)
*H04B 7/216* (2006.01)

(52) U.S. Cl. ............... 455/101; 455/562.1; 455/277.1; 455/67.11; 370/335; 375/299

(58) Field of Classification Search ............... 455/101, 455/500, 25, 63.4, 63.3, 509, 342, 343, 272; 370/330, 478, 315, 335, 337, 342, 344, 347; 375/299, 130–153

See application file for complete search history.

(56) References Cited

U.S. PATENT DOCUMENTS 5,280,637 A    1/1994  Larosa et al.
6,834,043 B1*  12/2004 Vook et al. .................. 370/310
6,850,741 B2*  2/2005  Lei et al. ..................... 455/101

FOREIGN PATENT DOCUMENTS

CN    1364358    8/2002

OTHER PUBLICATIONS

Fujii, "Beamspace-Time Transmit Diversity for Time-Domain Spreading DFDM-CDM Systems", IEICE Trans. Commun., vol. E86-B, No. 1, Jan. 2003, pp. 344-351.
Alamouti, "A Simple Transmit Diversity Technique for Wireless Communications", IEEE Journal on Select Areas in Communications, vol. 16, No. 8, Oct. 1998, pp. 1451-1458.

* cited by examiner

*Primary Examiner*—Rafael Perez-Gutierrez
*Assistant Examiner*—Lameka J Kirk
(74) *Attorney, Agent, or Firm*—The Farrell Law Firm

(57) ABSTRACT

A transmit diversity system, method, and computer program product which can prevent signal power from being wasted and also prevent interference between a plurality of beams. In the transmit diversity system, a transmitter transmits a signal after allocating the signal to a beamspace of multiple beams and a receiver receives the multiple beams and obtains a channel estimate of each of the multiple beams. A beam pair, which has the largest sum of powers of respective channel estimates of two corresponding beams, is selected from a plurality of beam pairs of the multiple beams. One of the two beams of the selected beam pair is selected as a single beam for use if the difference between the powers of the respective channel estimates of the two beams is larger than a predetermined value.

39 Claims, 20 Drawing Sheets

TRANSMIT DIVERSITY SYSTEM, METHOD AND COMPUTER PROGRAM PRODUCT

PRIORITY

This application claims priority to an application entitled "TRANSMIT DIVERSITY SYSTEM, BEAM SELECTION METHOD, SPREADING CODE ALLOCATION METHOD, AND COMPUTER PROGRAM PRODUCT FOR THE SAME", filed in the Japanese Patent Office on Apr. 25, 2003 and assigned Serial No. 2003-121788, an application entitled "TRANSMIT DIVERSITY SYSTEM, METHOD AND COMPUTER PROGRAM PRODUCT", filed in the Japanese Patent Office on Jun. 17, 2003 and assigned Serial No. 2003-172187, and an application entitled "TRANSMIT DIVERSITY SYSTEM, METHOD AND COMPUTER PROGRAM PRODUCT", filed in the Korean Patent Office on Mar. 24, 2004 and assigned Serial No. 2004-19969, the contents of each of which are incorporated herein by reference.

BACKGROUND OF THE INVENTION

1. Field of the Invention

The present invention relates generally to a transmit diversity system, method, and computer program product, which employ Orthogonal Frequency-Division Multiplexing Code-Division Multiplexing (OFDM-CDM) in which two-dimensional (i.e., time and frequency-domain) spreading is performed, and more particularly to a space-time transmit diversity system and a transmit-antenna array used in a mobile communication system.

2. Description of the Related Art

FIG. 13 is a diagram illustrating a space-time transmit diversity technique that uses space-time (ST) codes, which was proposed in a paper by S. M. Alamouti, entitled "A Simple Transmit Diversity Technique For Wireless Communications", IEEE Journal on Selected Areas In Communications, Vol. 16, No. 8, pp. 1451-1458, October 1998. According to Alamouti's transmit diversity technique, a 2×2 orthogonal space-time code matrix, for two transmit symbols $s_1$, $s_2$, generated by a space-time encoder 1300 illustrated in FIG. 13 is given by Equation 1:

$$\Omega = \begin{bmatrix} s_1 & s_2 \\ -s_2^* & s_1^* \end{bmatrix} \quad (1)$$

At time $t_1$, a transmission signal $s_1$ is transmitted from a first antenna 1301, and a transmission signal $s_2$ is simultaneously transmitted from a second antenna 1302. At time $t_2$, a transmission signal $-s_2^*$ is transmitted from the first antenna 1301, and a transmission signal $s_1^*$, is transmitted from the second antenna 1302.

Referring to FIG. 13, "h1" denotes a channel response from the first antenna 1301 to a terminal 1303, and "h2" denotes a channel response from the second antenna 1302 to the terminal 1303. Received signals $r_1$ and $r_2$ at times $t_1$ and $t_2$ are expressed by Equations 2 and 3, respectively.

$$r_1 = h_1 s_1 + h_2 s_2 \quad (2)$$

$$r_2 = -h_1 s_2^* + h_2 s_1^* \quad (3)$$

A receiver in the terminal 1303 decodes the received signals based on the channel response $h_1$ from the first antenna 1301 and the channel response $h_2$ from the second antenna 1302, and the decoded signals are expressed by Equations 4 and 5, respectively.

$$\hat{s}_1 = h_1^* r_1 + h_2 r_2^* = (|h_1|^2 + |h_2|^2) s_1 \quad (4)$$

$$\hat{s}_2 = h_2^* r_1 - h_1 r_2^* = (|h_1|^2 + |h_2|^2) s_2 \quad (5)$$

From the decoded signals, it is possible to detect the transmission signals $s_1$ and $s_2$, and also to achieve a maximum ratio combination.

FIGS. 14 to 16 illustrate a transmit diversity technique for improving transmission characteristics through optimal beam selection, which was proposed in a paper by M. Fuji, entitled "Beamspace-Time Transmit Diversity For Time-Domain Spreading OFDM-CDM Systems", IEICE Trans. on Communications, Vol. E86-b, No. 1, pp.344-351, January 2003.

In the transmit diversity technique using the optimal beam selection, a base station uses fixed multiple beams. However, each mobile station estimates a channel response from each of the multiple beams to calculate power of each beam (for example, add powers of all subcarriers in the multicarrier scheme). Then, the mobile station selects two neighboring beams (or a pair of neighboring beams), which provide the largest channel response power sum, and sends a beam-pair index representing the two selected beams to the base station. In this transmit diversity technique, the transmitter space-time encodes signals for transmission using a 2×2 orthogonal space-time coding matrix, and assigns the space-time coded signals to two beams appointed by the base station. In addition, a signal weighted by a beam forming array weight vector is spread using the OFDM-CDM that performs only the time-domain spreading. The spread signal is then multiplexed with signals of the other users.

Additionally, the receiver performs time domain dispreading to suppress all signals for the other users and thus decode a desired signal.

FIG. 17 illustrates how space-time coded signals are allocated to spread areas in a conventional space-time transmit diversity system. A space-time encoder 1701 space-time encodes data for transmission to output two space-time coded signals $[s_1, s_2]$ and $[-s_2^*, s_1^*]$. The two space-time coded signals $[s_1, s_2]$ and $[-s_2^*, s_1^*]$ are sequentially beam-steered by beam steering vectors 1702 and 1703, respectively, and are then multiplexed at an adder 1704.

Two signals $(s_1 W_{b1} + s_2 W_{b2}, -s_2^* W_{b1} + s_1^* W_{b2})$ output from the adder 1704, are spread in the time domain (or in the time direction) at two spread areas ($2 \times SF_{Time}$). To maintain orthogonality between codes in time-domain despreading, the spreading factor must be limited to the extent that there is no influence of channel variations in the time domain. For the space-time codes, it is required that the channel response be invariant depending on time slot lengths of a number of symbols outputted in the time domain. As a result, the design must be implemented such that there is no influence of variation in the time domain over the two spreading areas. However, if the time-domain spreading factor is limited below a predetermined value, the number of users that can be accommodated is decreased. In addition, if there is an influence of time variation over the two spreading areas, transmission characteristics are worsened.

In the two-beam selection method described above, if the user is located between two neighboring beams as illustrated in FIG. 18, beam diversity gain can be achieved, thereby improving transmission characteristics. If the user is located near the maximum gain of a beam as illustrated in FIG. 19, and the angular spread of a corresponding electromagnetic wave is narrow compared with the width of the beam, the beam gain can be achieved. However, despite the use of the multiple beams, only signals transmitted in substantially one beam reach a mobile station (corresponding to the user), thereby wasting signal power distributed to the other beams.

According to the above-described space-time transmit diversity technique, as signals for transmission are spread only in the time domain, all signals other than a signal for the user are suppressed in the despreading at the receiver. For example, if a number of users use different pairs of beams but one of the two beams for each beam pair is shared by different users, signals for the different users interfere with each other when the space-time codes are decoded. As a result, at a receiver of one user, all signals for the other users are suppressed through time-domain despreading to prevent the interference.

However, according to the two-dimensional spreading, in which all the time domain spreading and the frequency domain spreading are performed, interference between space-time codes allocated to one pair of beams and space-time codes allocated to the other pairs of beams, which share one beam, may not be suppressed in the time-domain partial despreading (at the two-dimensional spreading area) when the space-time codes of said one pair of beams are decoded. For example, when first and second beams #1 and #2 are used for a user #1, and the second beam #2 and a third beam #3 are used for a user #2 as illustrated in FIG. 20, if signals transmitted to the user #1 are denoted by $(s_1, s_2)$ and signals transmitted to the user #2 are denoted by $(s_3, s_4)$, channel responses at an m-th subcarrier from the first and second beams #1 and #2 to the user #1 are denoted respectively by $h_{m,1}$ and $h_{m,2}$, signals received by the first user #1 at the m-th subcarrier are given by Equations 6 and 7.

$$r_{m,1} = h_{m,1}s_1 + h_{m,2}s_2 + h_{m,2}s_3 \quad (6)$$

$$r_{m,2} = -h_{m,1}s_2^* + h_{m,2}s_1^* - h_{m,2}s_4^* \quad (7)$$

The received signals $r_{m,1}$ and $r_{m,2}$ are decoded using the channel responses $h_{m,1}$ and $h_{m,2}$, and the decoded signals can be expressed by Equations 8 and 9.

$$\hat{s}_{m,1} = h_{m,1}^* r_{m,1} + h_{m,2}r_{m,2}^* = (|h_{m,1}|^2 + |h_{m,2}|^2)s_1 + h_{m,1}^* h_{m,2}s_3 - |h_{m,2}|^2 s_4 \quad (8)$$

$$\hat{s}_{m,2} = h_{m,2}^* r_{m,1} - h_{m,1}r_{m,2}^* = (|h_{m,1}|^2 + |h_{m,2}|^2)s_2 + |h_{m,2}|^2 s_3 + h_{m,1}h_{m,2}^* s_4 \quad (9)$$

As shown in second and third components in the right-hand sides of these equations, two-dimensional spreading causes interference between the signals for the users #1 and #2.

Accordingly, for the time-domain spreading method, because the method uses spreading codes in the range where the channel responses can be considered invariant, it is possible to suppress signals of the other users through the despreading, without causing interference. However, according to the two-dimensional spreading method, partial correlation between spreading codes is not necessarily zero at each subcarrier, causing the interference components as described above. Because the decoded components and the response component $(|h_{m,1}|^2 + |h_{m,2}|^2)$ of the user's signal are different, it is impossible to completely remove the interference components even if frequency-domain combination is performed.

SUMMARY OF THE INVENTION

Therefore, the present invention has been designed in view of the above problems, and it is an object of the present invention to provide a transmit diversity system, method and program product, which provides excellent resistance to time variation and frequency selectivity of channels in the transmit diversity technique using multiple beams and space-time codes for two-dimensional spreading OFDM-CDM.

In accordance with a first aspect of the present invention, the above and other objects can be accomplished by a transmit diversity system comprising a transmitter for transmitting a signal after allocating the signal to a beamspace of multiple beams; a receiver for receiving the multiple beams and obtaining a channel estimate of each of the multiple beams; first selection means for selecting a beam pair from a plurality of beam pairs of the multiple beams, said beam pair having a largest sum of powers of respective channel estimates of two beams corresponding to said beam pair; and second selection means for selecting one of two beams from to the selected beam pair, if a difference between the powers of the respective channel estimates of the two beams from the selected beam pair is larger than a predetermined value.

In accordance with a second aspect of the present invention, there is provided the system according to the first aspect, wherein, if the difference between the powers of the respective channel estimates of the two beams from the selected beam pair is larger than the predetermined value, the second selection means selects one of the two beams from the selected beam pair, a power of a channel estimate of said one of the two beams being larger than a power of a channel estimate of the other beam of the two beams.

In accordance with a third aspect of the present invention, there is provided a transmit diversity system comprising a transmitter for space-time encoding a signal for transmission into a space-time coded signal, performing time domain spreading and frequency domain spreading of the space-time coded signal to produce a spread signal, and transmitting the spread signal after allocating the spread signal to a beamspace of multiple beams; and code allocation means for allocating spreading codes having a partial correlation of 0 in the time domain spreading, if a single beam used by one user is the same as one of multiple beams used by another user or if one of multiple beams used by one user is the same as one of multiple beams used by another user.

In accordance with a fourth aspect of the present invention, there is provided the system according to the third aspect, wherein the code allocation means additionally allocates spreading codes having a partial correlation of 0 in the time domain spreading to a plurality of users who use the same beam pair.

In accordance with a fifth aspect of the present invention, there is provided a receiver for receiving a signal allocated to a beamspace of multiple beams and obtaining a channel estimate of each of the multiple beams, said receiver comprising first selection means for selecting a beam pair from a plurality of beam pairs of the multiple beams, said beam pair having the largest sum of powers of respective channel estimates of two beams corresponding to said beam pair; and second selection means for selecting one of the two beams corresponding to the selected beam pair, if difference between the powers of the respective channel estimates of the two beams corresponding to the selected beam pair is larger than a predetermined value.

In accordance with a sixth aspect of the present invention, there is provided a transmitter for receiving a channel estimate from a receiver for receiving a signal allocated to a beamspace of multiple beams and obtaining a channel estimate of each of the multiple beams, said transmitter comprising first selection means for selecting a beam pair from a plurality of beam pairs of the multiple beams, said beam pair having the largest sum of powers of respective channel estimates of two beams corresponding to said beam pair; and second selection means for selecting one of the two beams corresponding to the selected beam pair, if difference between the powers of the respective channel estimates of the two beams corresponding to the selected beam pair is larger than a predetermined value.

In accordance with a seventh aspect of the present invention, there is provided a transmitter for space-time encoding a signal for transmission into a space-time coded signal, performing time domain spreading and frequency domain spreading of the space-time coded signal to produce a spread signal, and transmitting the spread signal after allocating the spread signal to a beamspace of multiple beams, said transmitter comprising code allocation means for allocating spreading codes having a partial correlation of 0 in the time domain spreading, if a single beam used by one user is the same as one of multiple beams used by another user, or if one of multiple beams used by one user is the same as one of multiple beams used by another user.

In accordance with an eighth aspect of the present invention, there is provided the transmitter according to the seventh aspect, wherein the code allocation means additionally allocates spreading codes having a partial correlation of 0 in the time domain spreading to a plurality of users who use the same beam pair.

In accordance with a ninth aspect of the present invention, there is provided a beam selection method in a transmit diversity system including a transmitter for transmitting a signal after allocating the signal to a beamspace of multiple beams and a receiver for receiving the multiple beams and obtaining a channel estimate of each of the multiple beams, said method comprising the steps of a) selecting a beam pair from a plurality of beam pairs of the multiple beams, said beam pair having the largest sum of powers of respective channel estimates of two beams corresponding to said beam pair; and b) selecting one of the two beams corresponding to the selected beam pair, if difference between the powers of the respective channel estimates of the two beams corresponding to the selected beam pair is larger than a predetermined value.

In accordance with a tenth aspect of the present invention, there is provided the method according to the ninth aspect, wherein said step b) comprises the step of selecting one of the two beams corresponding to the selected beam pair, a power of a channel estimate of said one of the two beams being larger than a power of a channel estimate of the other beam of the two beams, if the difference between the powers of the respective channel estimates of the two beams corresponding to the selected beam pair is larger than the predetermined value.

In accordance with an eleventh aspect of the present invention, there is provided a spreading code allocation method in a transmit diversity system including a transmitter for space-time encoding a signal for transmission into a space-time coded signal, performing time domain spreading and frequency domain spreading of the space-time coded signal to produce a spread signal, and transmitting the spread signal after allocating the spread signal to a beamspace of multiple beams, said method comprising the step of allocating spreading codes having a partial correlation of 0 in the time domain spreading, if a single beam used by one user is the same as one of multiple beams used by another user, or if one of multiple beams used by one user is the same as one of multiple beams used by another user.

In accordance with a twelfth aspect of the present invention, there is provided a spreading code allocation method in a transmit diversity system including a transmitter for space-time encoding a signal for transmission into a space-time coded signal, performing time domain spreading and frequency domain spreading of the space-time coded signal to produce a spread signal, and transmitting the spread signal after allocating the spread signal to a beamspace of multiple beams, said method comprising the step of allocating spreading codes having a partial correlation of 0 in the time domain spreading to a plurality of users who use the same beam pair.

In accordance with a thirteenth aspect of the present invention, there is provided a recording medium containing a beam selection program for allowing a receiver to perform a beam selection method in a transmit diversity system, said receiver receiving a signal allocated to a beamspace of multiple beams and obtaining a channel estimate of each of the multiple beams, said method comprising the steps of selecting a beam pair from a plurality of beam pairs of the multiple beams, said beam pair having the largest sum of powers of respective channel estimates of two beams corresponding to said beam pair; and selecting one of the two beams corresponding to the selected beam pair, if difference between the powers of the respective channel estimates of the two beams corresponding to the selected beam pair is larger than a predetermined value.

In accordance with a fourteenth aspect of the present invention, there is provided a recording medium containing a beam selection program for allowing a transmitter to perform a beam selection method in a transmit diversity system, said transmitter receiving a channel estimate from a receiver for receiving a signal allocated to a beamspace of multiple beams and obtaining a channel estimate of each of the multiple beams, said method comprising the steps of selecting a beam pair from a plurality of beam pairs of the multiple beams, said beam pair having the largest sum of powers of respective channel estimates of two beams corresponding to said beam pair; and selecting one of the two beams corresponding to the selected beam pair, if difference between the powers of the respective channel estimates of the two beams corresponding to the selected beam pair is larger than a predetermined value.

In accordance with a fifteenth aspect of the present invention, there is provided a recording medium containing a spreading code allocation program for allowing a transmitter to perform a spreading code allocation method in a transmit diversity system, said transmitter space-time encoding a signal for transmission into a space-time coded signal, performing time domain spreading and frequency domain spreading of the space-time coded signal to produce a spread signal, and transmitting the spread signal after allocating the spread signal to a beamspace of multiple beams, said method comprising the step of allocating spreading codes having a partial correlation of 0 in the time domain spreading, if a single beam used by one user is the same as one of multiple beams used by another user, or if one of multiple beams used by one user is the same as one of multiple beams used by another user.

In accordance with a sixteenth aspect of the present invention, there is provided the medium according to the fifteenth aspect, wherein said method further comprises the step of allocating spreading codes having a partial correlation of 0 in the time domain spreading to a plurality of users who use the same beam pair.

In accordance with an seventeenth aspect of the present invention, there is provided a transmit diversity system comprising a transmitter for space-time encoding a signal for transmission into a space-time coded signal, performing time domain spreading and frequency domain spreading of the space-time coded signal to produce a spread signal, and transmitting the spread signal after allocating the spread signal to a beamspace of multiple beams; beam allocation means for allocating a space-time coded signal in spatial domain to a plurality of beams of the multiple beams, and spreading code allocation means for allocating a space-time coded signal in time domain to a plurality of spreading codes in the same spreading area.

In accordance with an eighteenth aspect of the present invention, there is provided the system according to the seventeenth aspect, wherein the beam allocation means selects a beam pair from a plurality of beam pairs of the multiple beams received by a receiver, said beam pair having the largest sum of powers of respective channel estimates of two beams corresponding to said beam pair, and, if difference between the powers of the respective channel estimates of the two beams corresponding to the selected beam pair is larger than a predetermined value, the beam allocation means selects one of the two beams corresponding to the selected beam pair and allocates the space-time coded signal of the spatial domain to said one of the two beams.

In accordance with a nineteenth aspect of the present invention, there is provided the system according to the seventeenth aspect, wherein the spreading code allocation means allocates spreading codes having a partial correlation of 0 in the same spreading area, if a single beam used by one user is the same as one of multiple beams used by another user, or if one of multiple beams used by one user is the same as one of multiple beams used by another user.

In accordance with a twentieth aspect of the present invention, there is provided the system according to the eighteenth aspect, wherein the spreading code allocation means classifies the beam pair selected by the beam allocation means into beam pair groups in such a manner that beam pairs, which do not interfere with each other, are classified into the same beam pair group and beam pairs, which interfere with each other, are classified into different beam pair groups, and the spreading code allocation means then allocates spreading codes of a two-dimensional spreading factor to different beam pair groups, said spreading codes being branched from different branches in a time-domain spreading layer of a spreading code tree.

In accordance with a twenty first aspect of the present invention, there is provided the system according to the nineteenth aspect, wherein the spreading code allocation means classifies the beam pair selected by the beam allocation means into beam pair groups in such a manner that beam pairs, which do not interfere with each other, are classified into the same beam pair group and beam pairs, which interfere with each other, are classified into different beam pair groups, and the spreading code allocation means then allocates spreading codes of a two-dimensional spreading factor to different beam pair groups, said spreading codes being branched from different branches in a time-domain spreading layer of a spreading code tree.

In accordance with a twenty second aspect of the present invention, there is provided the system according to the eighteenth aspect, wherein the spreading code allocation means allocates spreading codes of a two-dimensional spreading factor to said one of the two beams selected by the beam allocation means, said spreading codes being branched from different branches in a time-domain spreading layer of a spreading code tree.

In accordance with a twenty third aspect of the present invention, there is provided the system according to the nineteenth aspect, wherein the spreading code allocation means allocates spreading codes of a two-dimensional spreading factor to said one of the two beams selected by the beam allocation means, said spreading codes being branched from different branches in a time-domain spreading layer of a spreading code tree.

In accordance with a twenty fourth aspect of the present invention, there is provided a transmit diversity method in a transmit diversity system comprising a transmitter for space-time encoding a signal for transmission into a space-time coded signal, performing time domain spreading and frequency domain spreading of the space-time coded signal to produce a spread signal, and transmitting the spread signal after allocating the spread signal to a beamspace of multiple beams, said method comprising the steps of: a) allocating a space-time coded signal in spatial domain to a plurality of beams of the multiple beams; and b) allocating a space-time coded signal in time domain to a plurality of spreading codes in the same spreading area.

In accordance with a twenty fifth aspect of the present invention, there is provided the method according to the twenty fifth aspect, wherein, if difference between powers of respective channel estimates of two beams corresponding to a beam pair selected from a plurality of beam pairs of the multiple beams received by a receiver, said beam pair having the largest sum of powers of respective channel estimates of two beams corresponding to said beam pair, is larger than a predetermined value, one of the two beams corresponding to the selected beam pair is selected, and the space-time coded signal of the spatial domain is allocated to said one of the two beams.

In accordance with a twenty sixth aspect of the present invention, there is provided the method according to the twenty fourth aspect, wherein spreading codes having a partial correlation of 0 in the same spreading area are allocated, if a single beam used by one user is the same as one of multiple beams used by another user, or if one of multiple beams used by one user is the same as one of multiple beams used by another user.

In accordance with a twenty seventh aspect of the present invention, there is provided the method according to the twenty fifth aspect, wherein spreading codes having a partial correlation of 0 in the same spreading area are allocated, if a single beam used by one user is the same as one of multiple beams used by another user, or if one of multiple beams used by one user is the same as one of multiple beams used by another user.

In accordance with a twenty eighth aspect of the present invention, there is provided the method according to the twenty fifth aspect, wherein said beam pair having the largest sum of powers is classified into beam pair groups in such a manner that beam pairs, which do not interfere with each other, are classified into the same beam pair group and beam pairs, which interfere with each other, are classified into different beam pair groups, and spreading codes of a two-dimensional spreading factor are allocated to different beam pair groups, said spreading codes being branched from different branches in a time-domain spreading layer of a spreading code tree.

In accordance with a twenty ninth aspect of the present invention, there is provided the method according to the twenty sixth aspect, wherein said beam pair having the largest sum of powers is classified into beam pair groups in such a manner that beam pairs, which do not interfere with each other, are classified into the same beam pair group and beam pairs, which interfere with each other, are classified into different beam pair groups, and spreading codes of a two-dimensional spreading factor are allocated to different beam pair groups, said spreading codes being branched from different branches in a time-domain spreading layer of a spreading code tree.

In accordance with a thirtieth aspect of the present invention, there is provided the method according to the twenty seventh aspect, wherein said beam pair having the largest sum of powers is classified into beam pair groups in such a manner that beam pairs, which do not interfere with each other, are classified into the same beam pair group and beam pairs, which interfere with each other, are classified into different beam pair groups, and spreading codes of a two-dimensional spreading factor are allocated to different beam pair groups, said spreading codes being branched from different branches in a time-domain spreading layer of a spreading code tree.

In accordance with a thirty first aspect of the present invention, there is provided the method according to the twenty fifth aspect, wherein spreading codes of a two-dimensional spreading factor are allocated to said one of the two beams selected by the beam allocation means, said spreading codes being branched from different branches in a time-domain spreading layer of a spreading code tree.

In accordance with a thirty second aspect of the present invention, there is provided the method according to the twenty sixth aspect, wherein spreading codes of a two-dimensional spreading factor are allocated to said one of the two beams selected by the beam allocation means, said spreading codes being branched from different branches in a time-domain spreading layer of a spreading code tree.

In accordance with a thirty third aspect of the present invention, there is provided the method according to the twenty seventh aspect, wherein spreading codes of a two-dimensional spreading factor are allocated to said one of the two beams selected by the beam allocation means, said spreading codes being branched from different branches in a time-domain spreading layer of a spreading code tree.

In accordance with a thirty fourth aspect of the present invention, there is provided a recording medium containing a communication program for allowing a transmit diversity system to perform a transmit diversity method, said transmit diversity system comprising a transmitter for space-time encoding a signal for transmission into a space-time coded signal, performing time domain spreading and frequency domain spreading of the space-time coded signal to produce a spread signal, and transmitting the spread signal after allocating the spread signal to a beamspace of multiple beams, said method comprising the steps of a) allocating a space-time coded signal in spatial domain to a plurality of beams of the multiple beams; and b) allocating a space-time coded signal in time domain to a plurality of spreading codes in the same spreading area.

In accordance with a thirty fifth aspect of the present invention, there is provided the medium according to the thirty fourth aspect, wherein, in the method, if difference between powers of respective channel estimates of two beams corresponding to a beam pair selected from a plurality of beam pairs of the multiple beams received by a receiver, said beam pair having the largest sum of powers of respective channel estimates of two beams corresponding to said beam pair, is larger than a predetermined value, one of the two beams corresponding to the selected beam pair is selected, and the space-time coded signal of the spatial domain is allocated to said one of the two beams.

In accordance with a thirty sixth aspect of the present invention, there is provided the medium according to the thirty fourth aspect, wherein, in the method, spreading codes having a partial correlation of 0 in the same spreading area are allocated, if a single beam used by one user is the same as one of multiple beams used by another user, or if one of multiple beams used by one user is the same as one of multiple beams used by another user.

In accordance with a thirty seventh aspect of the present invention, there is provided the medium according to the thirty fifth aspect, wherein, in the method, spreading codes having a partial correlation of 0 in the same spreading area are allocated, if a single beam used by one user is the same as one of multiple beams used by another user, or if one of multiple beams used by one user is the same as one of multiple beams used by another user.

In accordance with a thirty eighth aspect of the present invention, there is provided the medium according to the thirty fifth aspect, wherein, in the method, said beam pair having the largest sum of powers is classified into beam pair groups in such a manner that beam pairs, which do not interfere with each other, are classified into the same beam pair group and beam pairs, which interfere with each other, are classified into different beam pair groups, and spreading codes of a two-dimensional spreading factor are allocated to different beam pair groups, said spreading codes being branched from different branches in a time-domain spreading layer of a spreading code tree.

In accordance with a thirty ninth aspect of the present invention, there is provided the medium according to the thirty sixth aspect, wherein, in the method, said beam pair having the largest sum of powers is classified into beam pair groups in such a manner that beam pairs, which do not interfere with each other, are classified into the same beam pair group and beam pairs, which interfere with each other, are classified into different beam pair groups, and spreading codes of a two-dimensional spreading factor are allocated to different beam pair groups, said spreading codes being branched from different branches in a time-domain spreading layer of a spreading code tree.

In accordance with a fortieth aspect of the present invention, there is provided the medium according to the thirty fifth aspect, wherein, in the method, spreading codes of a two-dimensional spreading factor are allocated to said one of the two beams selected by the beam allocation means, said spreading codes being branched from different branches in a time-domain spreading layer of a spreading code tree.

In accordance with a forty first aspect of the present invention, there is provided the medium according to the thirty sixth aspect, wherein, in the method, spreading codes of a two-dimensional spreading factor are allocated to said one of the two beams selected by the beam allocation means, said spreading codes being branched from different branches in a time-domain spreading layer of a spreading code tree.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
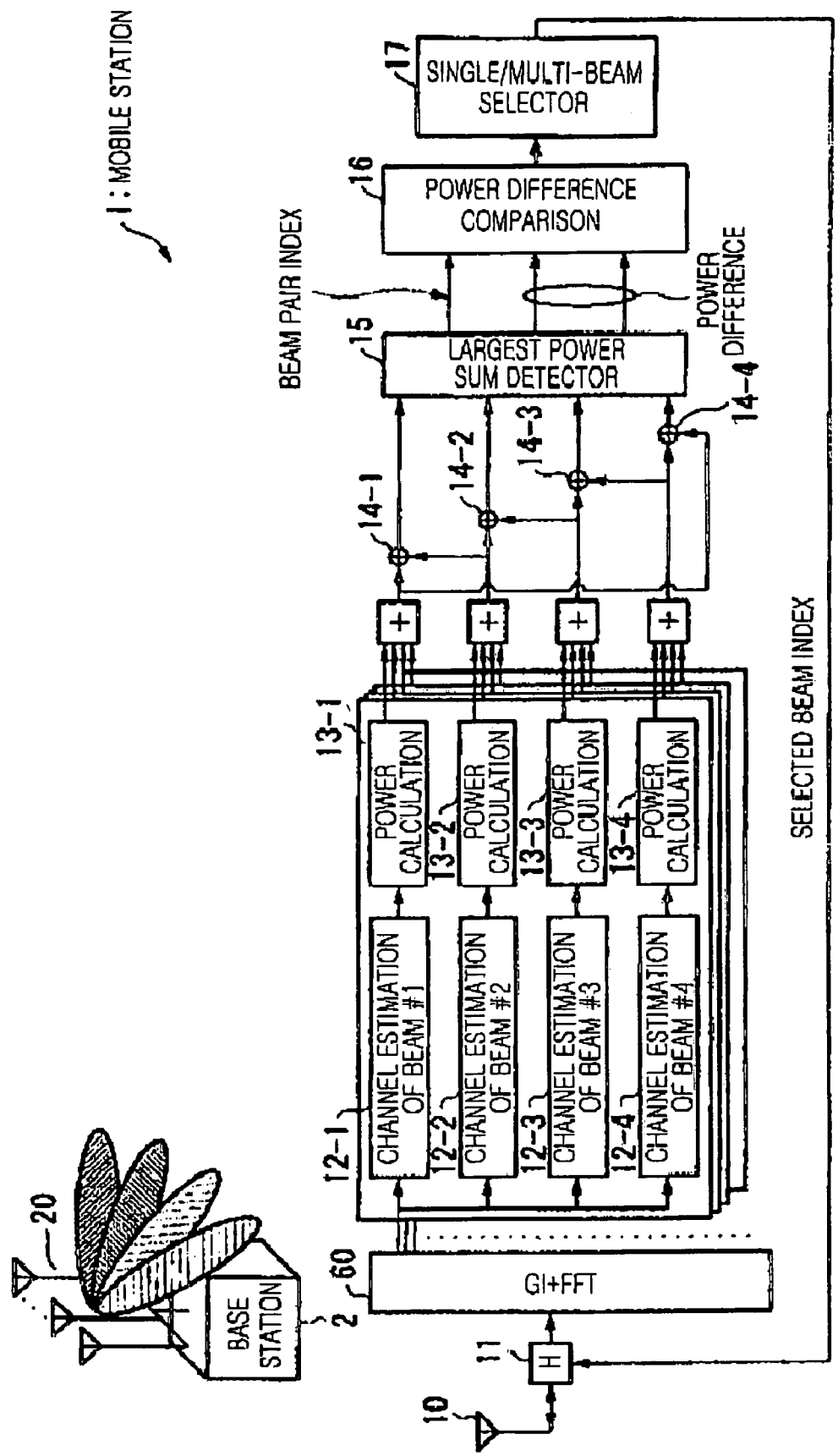
FIG. 1 is a block diagram showing the configuration of a closed-loop beam selector in a mobile station according to a first embodiment of the present invention.

A beamspace-time transmit diversity system according to preferred embodiments of the present invention will be described in detail herein below with reference to the annexed drawings. In the drawings, the same or similar elements are denoted by the same reference numerals even though they are depicted in different drawings.

First Embodiment

FIG. 1 is a block diagram illustrating a beamspace-time transmit diversity system according to a first embodiment of the present invention. The beamspace-time transmit diversity system according to the first embodiment includes a mobile station (transceiver) 1 and a base station (transceiver) 2. As illustrated in FIG. 1, the beamspace-time transmit diversity system according to the first embodiment of the present invention employs a closed-loop beam selection scheme.

The mobile station 1 is provided with a closed-loop beam selector including an antenna 10, a switch 11, first to fourth channel estimators 12-1 to 12-4, first to fourth power calculators 13-1 to 13-4, first to fourth adders 14-1 to 14-4, a largest beam-pair power sum detector 15, a power-difference comparator 16, and a single/multi-beam selector 17. The antenna 10 receives a plurality of beams (first to fourth beams in this embodiment) radiated from a transmit antenna array 20 in the base station 2, outputs the received signals to the switch 11, and also radiates a selected beam index input from the switch 11.

The switch 11 outputs the received signals input from the antenna 10 to the channel estimators 12-1 to 12-4, and outputs a selected beam index input from the power comparator 16 to the antenna 10. Additionally, the switch 11 switches the input/output operating modes according to a controller (not shown).

A fast Fourier transformer 60 receives the signals received through the antenna 10, and removes guard intervals (GI) from the received signal after down conversion. The fast Fourier transformer 60 converts the received signals to subcarrier signals through fast Fourier transformation, and outputs the subcarrier signals, i.e., the first to fourth beams, to the channel estimators 12-1 to 12-4, respectively.

The channel estimators 12-1 to 12-4 despread the subcarrier signals input from the switch 11 using spreading codes of each subcarrier. Pilot signal modulation components are removed from the despread signals to estimate channel responses. The channel estimators 12-1 to 12-4 output the estimated channel responses to the power calculators 13-1 to 13-4.

The power calculators 13-1 to 13-4 calculate powers of the channel responses input from the channel estimators 12-1 to 12-4, and add the calculated powers over all subcarriers to estimate respective powers from the beams and output the estimated powers to the adders 14-1 to 14-4. That is, the first power calculator 13-1 outputs an estimated power $P_1$ of beam #1 to the first and fourth adders 14-1 and 14-4. The second power calculator 13-2 outputs an estimated power $P_2$ of beam #2 to the first and second adders 14-1 and 14-2. The third power calculator 13-3 outputs an estimated power $P_3$ of beam #3 to the second and third adders 14-2 and 14-3. The fourth power calculator 13-4 outputs an estimated power $P_4$ of beam #4 to the third and fourth adders 14-3 and 14-4.

Each of the adders 14-1 to 14-4 adds two corresponding powers of the estimated powers $P_1$ to $P_4$ of the first to fourth beams input from the power calculators 13-1 to 13-4, and outputs the sum of the powers to the largest beam-pair power sum detector 15. That is, the first adder 14-1 receives the power estimates $P_1$ and $P_2$ of the beams #1 and #2, and outputs the sum of the power estimates $(P_1+P_2)$ to the largest beam-pair power sum detector 15. The second adder 14-2 receives the power estimates $P_2$ and $P_3$ of the beams #2 and #3, and outputs the sum of the power estimates $(P_2+P_3)$ to the largest beam-pair power sum detector 15. The third adder 14-3 receives the power estimates $P_3$ and $P_4$ of the beams #3 and #4, and outputs the sum of the power estimates $(P_3+P_4)$ to the largest beam-pair power sum detector 15. The fourth adder 14-4 receives the power estimates $P_4$ and $P_1$ of the beams #4 and #1, and outputs the sum of the power estimates $(P_4+P_1)$ to the largest beam-pair power sum detector 15.

The largest beam-pair power sum detector 15 receives and compares the four beam-pair power sums $P_1+P_2$, $P_2+P_3$, $P_3+P_4$, and $P_4+P_1$ to determine the largest of the four beam-pair power sums. The largest beam-pair power sum detector 15 outputs a beam pair index corresponding to the determined largest beam-pair power sum and respective power estimates of the beams represented by the beam pair index to the power difference comparator 16.

Here, a beam pair index represents a combination of beams corresponding to a beam-pair power sum. For example, if the power sum $P_1+P_2$ is the largest power sum, a corresponding beam pair index is defined as (beam #1, #2) representing a combination of beams #1 and #2. Beam-pair indices are defined for the other beam-pair power sums in the same manner.

The power estimates output from the largest beam-pair power sum detector 15 are respective power estimates of a plurality of beams (two beams in this example) corresponding to the beam pair index output from the largest beam-pair power sum detector 15. For example, if the largest beam-pair power sum detector 15 outputs a beam pair index (beam #1, #2), the power estimates output from the largest beam-pair power sum detector 15 are respective power estimates $P_1$ and $P_2$ of a plurality of beams corresponding to the beam pair index (beam #1, #2).

The power difference comparator 16 receives a beam pair index and respective power estimates of the beams represented by the beam pair index, compares the difference between the received power estimates with a predetermined threshold, and then outputs the compared result to the single/multi-beam selector 17. The single/multi-beam selector 17 receives the compared result of the difference between the power estimates of the plurality of beams represented by the beam pair index, selects a single beam or multiple beams of the plurality of beams according to the compared result, and then outputs a beam index, corresponding to the selected beam or beams, to the switch 11.

If the power difference is equal to or larger than the predetermined threshold, the single/multi-beam selector 17 selects only one of the plurality of beams that has the largest power estimate. However, if the power difference is smaller than the predetermined threshold, the single/multi-beam selector 17 selects all of the plurality of beams represented by the beam pair index, i.e., both beams in the beam pair index.

Figure 2:
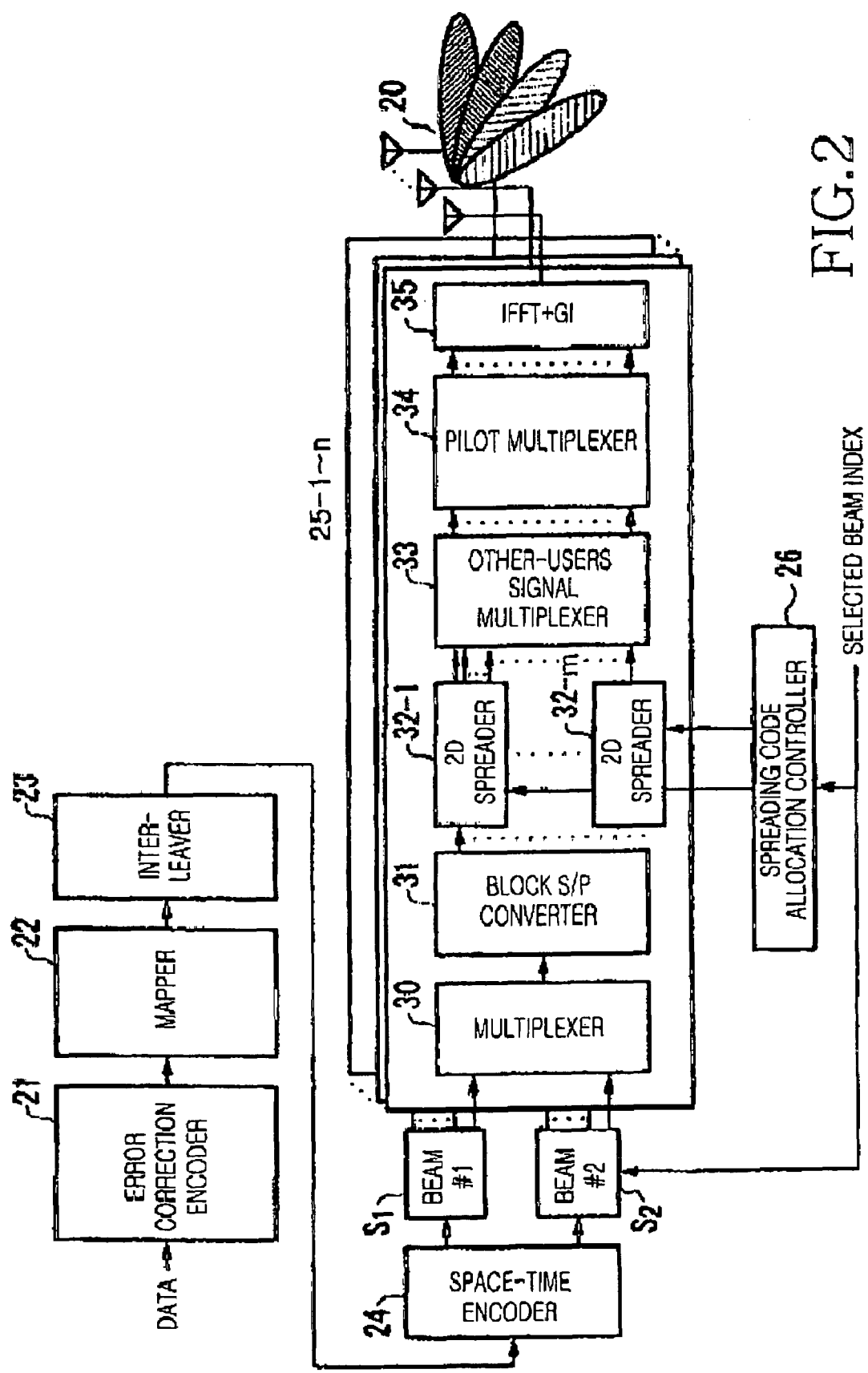
FIG. 2 is a block diagram illustrating a base station according to the first embodiment of the present invention.

FIG. 2 is a block diagram illustrating the base station 2 according to the first embodiment of the present invention. As illustrated in FIG. 2, the base station 2 includes the transmit antenna array 20, an error correction encoder 21, a mapper 22, an interleaver 23, a space-time encoder 24, antenna branches 25-1 to 25-$n$ (n is a natural number), and a spreading code allocation controller 26. The error correction encoder 21 receives data for transmission, and outputs the data to the mapper 22, after error correction encoding. The mapper 22 receives the error correction coded data, and outputs it to the interleaver 23, after modulation constellation mapping. The interleaver 23 receives the mapped data and outputs it to the space-time encoder 24, after reordering of the data to spread burst errors.

The space-time encoder 24 space-time encodes the signal output from the interleaver 23 with the 2×2 orthogonal space-time coding matrix shown above in Equation 1. The space-time encoder 24 allocates and outputs the space-time coded signal to a beam or beams represented by a selected beam index received from the mobile station 1.

In the first embodiment, the base station 2 receives, for example, a beam-pair index representing selected beams #1 and #2, and the space-time encoder 24 allocates the space-time coded signal to the beams #1 and #2, which are then output to the corresponding antenna branches 25-1 to 25-$n$.

Each of the antenna branches 25-1 to 25-$n$ includes a multiplexer 30, a block S/P converter 31, two-dimensional spreaders 32-1 to 32-$m$ (m is a natural number), an other-users signal multiplexer 33, a pilot signal multiplexer 34, and a Inverse Fast Fourier Transformer and guard index (=IFFT+GI) 35.

The multiplexer 30 receives the space-time coded signal allocated by the space-time encoder 24 to the beams represented by the selected beam index, and multiplexes and outputs the beams to the block S/P converter 31. In the first embodiment, for example, the multiplexer 30 multiplies the space-time coded transmission symbols by a corresponding array weight of the transmit antenna array 20 to multiplex beams #1 and #2.

The block S/P converter 31 receives the beamspace-time coded symbols multiplexed with beams #1 and #2, and outputs the received symbols to the two-dimensional spreaders 32-1 to 32-$m$ after performing serial-to-parallel conversion of the received symbols in units of two symbols.

Figure 3:
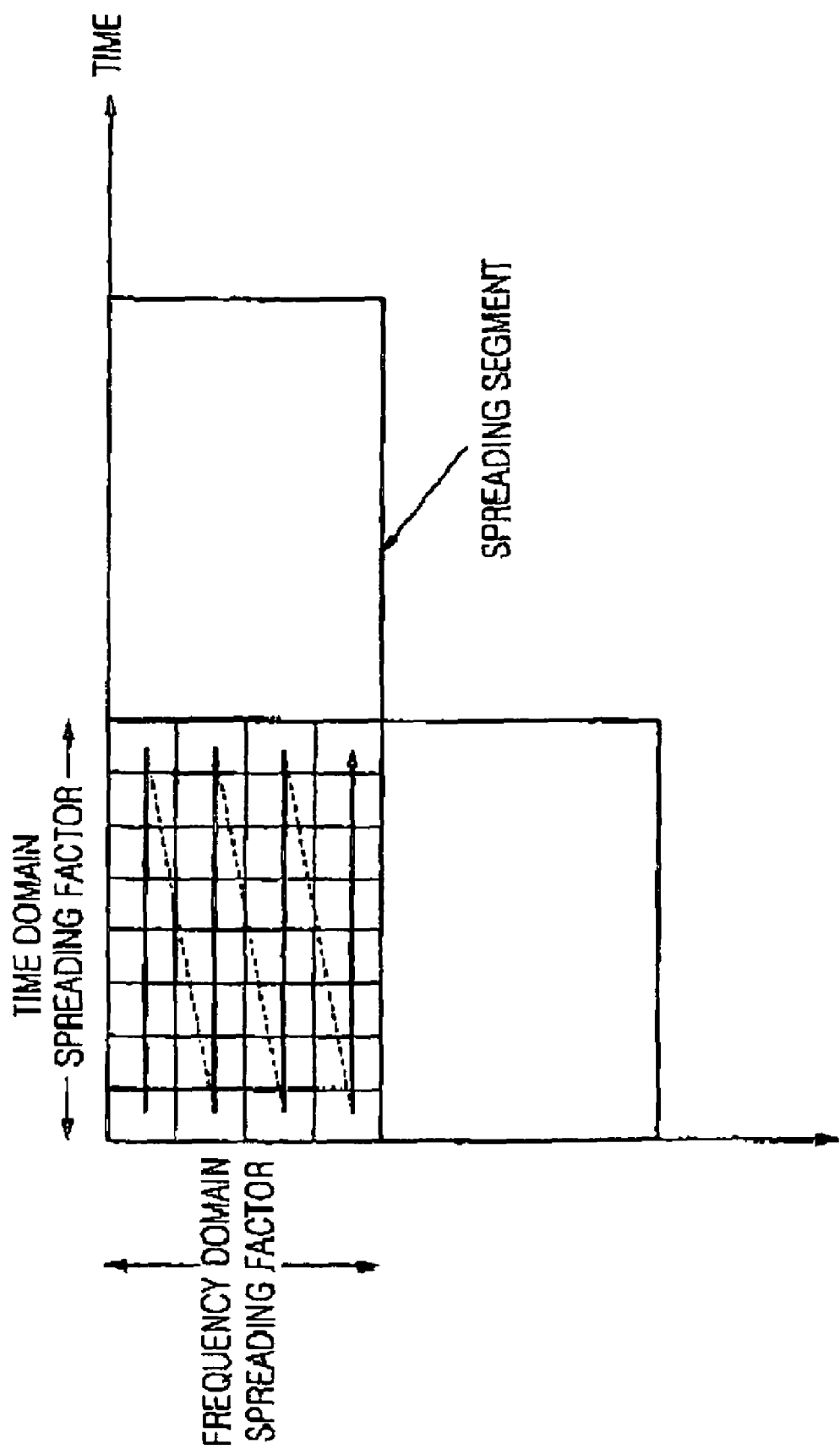
FIG. 3 is a conceptual diagram illustrating two-dimensional spreading according to the present invention.

The two-dimensional spreaders 32-1 to 32-$m$ receive and allocate the serial-to-parallel converted beamspace-time coded symbols to spreading segments as illustrated in FIG. 3. The two-dimensional spreaders 32-1 to 32-$m$ use Walsh codes at each spreading segment to perform two-dimensional spreading in both the time and frequency domains or directions, and output the spread signals to the other-users signal multiplexer 33.

Referring to FIG. 3, the two-dimensional spreading segment is defined, as a spreading area, by the number ($SF_{Time}$) of OFDM symbols in the time domain and the number ($SF_{Freq}$) of subcarriers in the frequency domain. The two-dimensional spreaders 32-1 to 32-$m$ use spreading codes of a spreading factor ($SF_{Time} \times SF_{Freq}$) (i.e., time domain spreading factor×frequency domain spreading factor) assigned by the spreading code allocation controller 26. The two-dimensional spreaders 32-1 to 32-$m$ perform time domain spreading at a first subcarrier, and then perform time domain spreading at a subcarrier adjacent to the first subcarrier. By repeating the time domain spreading in this manner, the two-dimensional spreaders 32-1 to 32-$m$ perform two-dimensional spreading in both the time domain and the frequency domain.

The other-users signal multiplexer 33 receives the beamspace-time coded transmission symbols, which were two-dimensionally spread in the time and frequency domains, and multiplexes the symbols of a plurality of users and outputs the multiplexed data to the pilot signal multiplexer 34. The pilot signal multiplexer 34 time-spreads (or spreads in the time domain) pilot signals for the beams, multiplexes the pilot signals with the spread data multiplexed with data of the other users, and outputs the multiplexed data to the inverse fast Fourier transformer 35.

The IFFT+GI 35 converts the received data to a time domain signal via Inverse Fast Fourier Transformation (IFFT), adds a guard interval (GI) to the signal, performs up-conversion to a carrier frequency, and then outputs the converted signal to the transmit antenna array 20. The transmit antenna array 20 includes a plurality of antennas (n antennas in this example) corresponding respectively to the antenna branches 25-1 to 25-$n$. The transmit antenna array 20 radiates a plurality of transmission signals received from the respective IFFT+GI 35 of the antenna branches 25-1 to 25-$n$.

When a single beam used by a user is the same as one of multiple beams used by another user, or one of multiple beams used by a user is the same as one of multiple beams used by another user, the spreading code allocation controller 26 allocates spreading codes that provide a partial correlation of 0 in the time domain spreading to the beams. In addition, when a plurality of users use the same beam pair, the spreading code allocation controller 26 allocates spreading codes that provide a partial correlation of 0 in the time domain spreading to the corresponding beams. The spreading code allocation controller 26 outputs the allocated spreading codes to each of the two-dimensional spreaders 32-1 to 32-m.

Figure 4:
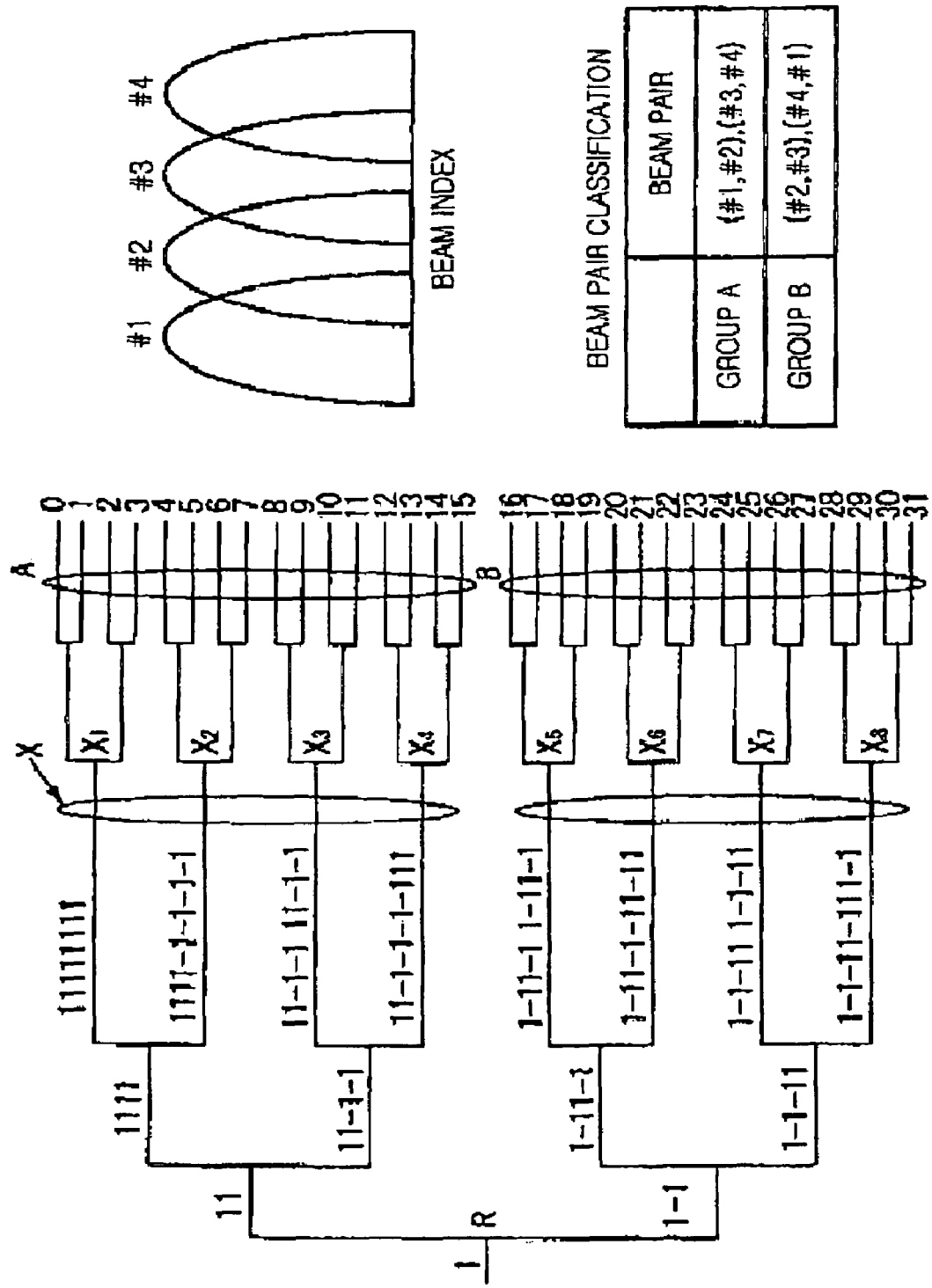
FIG. 4 is a conceptual diagram illustrating generating and allocating of spreading codes when two beams are selected, according to the first embodiment of the present invention.

FIG. 4 is a conceptual diagram illustrating how the spreading code allocation controller 26 allocates spreading codes. Referring to FIG. 4, it is assumed that a user using a beam pair (#1, #2) and a user using a beam pair (#3, #4) belong to a group A, and a user using a beam pair (#2, #3) and a user using a beam pair (#4, #1) belong to a group B. If a path angular spread from the base station to each terminal is appropriately narrow, no interference occurs between signals allocated by beam division to different beam pairs in the same group. In addition, signals for a plurality of users in the same beam pair do not interfere with each other when space-time codes are decoded because the users use the same pair of beams. However, interference components occur between signals for different users who belong to different groups as described above (see Equations 8 and 9).

To prevent interference components, spreading codes are allocated to users (or beam pairs) in the following manner. Users (or beam pairs) belonging to the same group are allocated spreading codes corresponding to leaves generated respectively from one set of nodes among a plurality of nodes having the same time domain spreading factor (see "X" in FIG. 4) in a Walsh spreading code tree illustrated in FIG. 4. However, users belonging to different groups are allocated, different sets of spreading codes corresponding to different sets of leaves generated respectively from different sets of nodes (of a root or a node closer to the root, compared to the time domain spreading factor X) in the Walsh spreading code tree illustrated in FIG. 4.

In the example illustrated in FIG. 4, 32-bit spreading codes 0 to 15 (see "A" in FIG. 4), which are leaves generated respectively from one set of nodes ($X_1$, $X_2$, $X_3$ and $X_4$) among a plurality of nodes $X_1$ to $X_8$ having the same time domain spreading factor (see "X" in FIG. 4), are allocated to users belonging to the group A (i.e., a user using the beam pair (#1, #2) and a user using the beam pair (#3, #4)). 32-bit spreading codes 16 to 32 (see "B" in FIG. 4), which are leaves generated respectively from nodes ($X_5$, $X_6$, $X_7$ and $X_8$) among the plurality of nodes $X_1$ to $X_8$ having the same time domain spreading factor (see "X" in FIG. 4), are allocated to users belonging to the group B (i.e., a user using the beam pair (#2, #3) and a user using the beam pair (#4, #1)).

Figure 5:
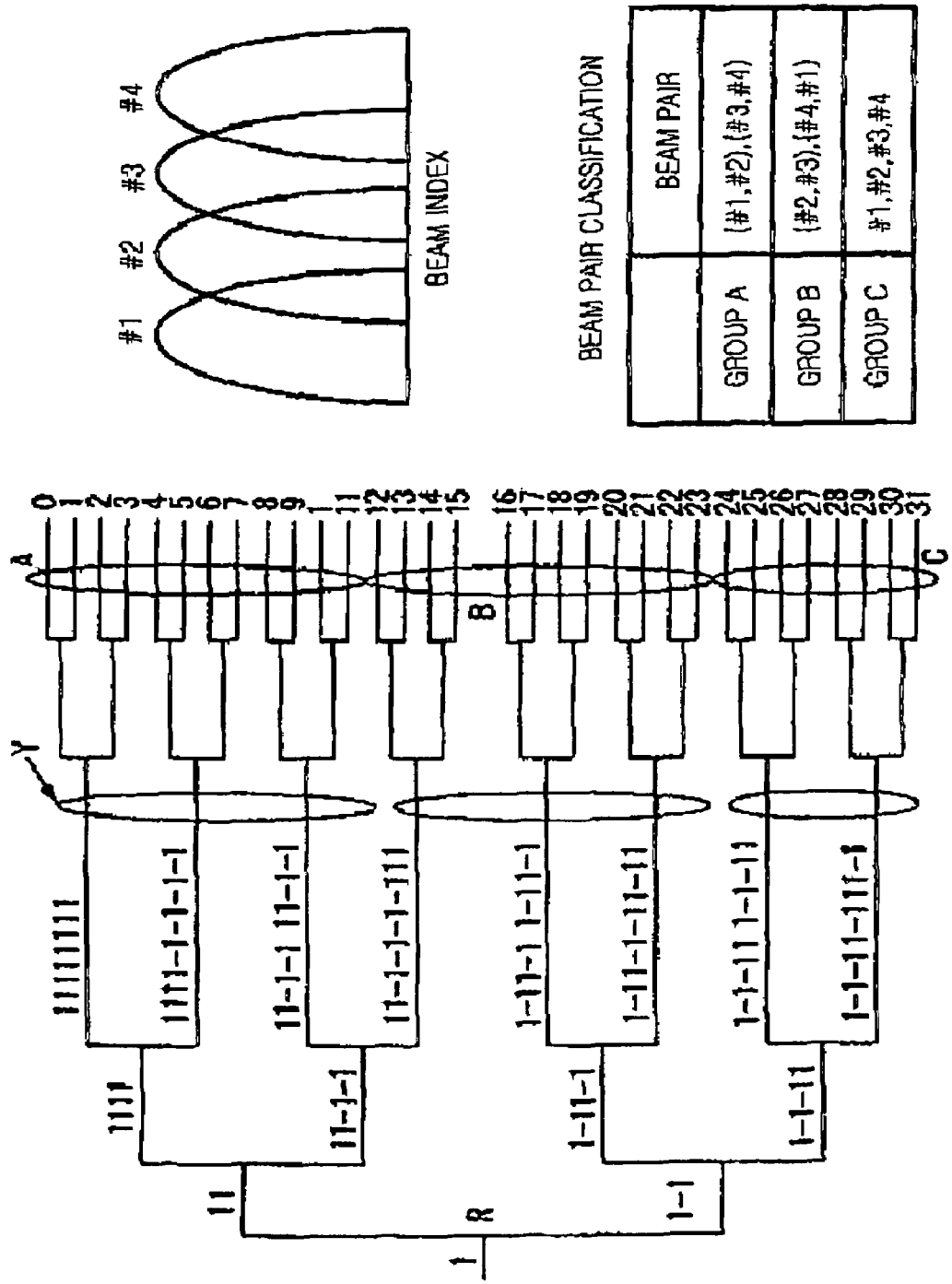
FIG. 5 is a conceptual diagram illustrating generating and allocating spreading codes when single or multiple beams are selected, according to the first embodiment of the present invention.

FIG. 5 is a diagram illustrating a method for allocating spreading codes when selecting a single beam or multiple beams. In FIG. 5, it is assumed that the user groups are classified into groups A and B, in which multiple beams are allocated to each user, and a group C, in which a single beam is allocated to each other, as shown in a beam pair classification table.

As described above, no interference occurs between signals for users in the same group. However, interference components occur between signals for different users who belong to different groups (see the above Equations 8 and 9).

Accordingly, users belonging to the same group are allocated spreading codes corresponding to leaves generated respectively from the same set of nodes among a plurality of nodes having the same time domain spreading factor (see "Y" in FIG. 4) in a Walsh spreading code tree illustrated in FIG. 5. Users belonging to different groups are allocated different sets of spreading codes corresponding to different sets of leaves generated respectively from different sets of nodes (of a root or a node closer to the root.

As illustrated in FIG. 5, 32-bit spreading codes 0 to 11 (see "A" in FIG. 5) are allocated to users belonging to the group A (i.e., a user using the beam pair (#1, #2) and a user using the beam pair (#3, #4)). 32-bit spreading codes 12 to 23 (see "B" in FIG. 5) are allocated to users belonging to the group B (i.e., a user using the beam pair (#2, #3) and a user using the beam pair (#4, #1)). 32-bit spreading codes 24 to 31 (see "C" in FIG. 5) are allocated to users belonging to the group C (i.e., a user using the first beam #1, a user using the second beam #2, a user using the third beam #3, and a user using the fourth beam #4).

To prevent the occurrence of interference between spreading codes during frequency domain combination, different sets of spreading codes generated from one set of nodes having the same time domain spreading factor are allocated on a preferential basis (described below) to a plurality of users who use the same beam pair.

For example, in the example illustrated in FIG. 4, if a plurality of users select and use the same beam pair (#1, #2), spreading codes 0 to 15 are selected for the users because, as described above, spreading codes generated from one set of nodes among a plurality of nodes having the same time domain spreading factor (see "X" in FIG. 4) are allocated to beams used by users of the same group. Here, different sets of spreading codes generated from the same set of nodes having the same time domain spreading factor are allocated to signals for the plurality of users. For example, one set of spreading codes 0, 4, 8, and 12 are preferentially allocated, and as the number of users increases, another set of spread codes 2, 6, 10, and 14 are subsequently allocated in a sequential manner.

Figure 6:
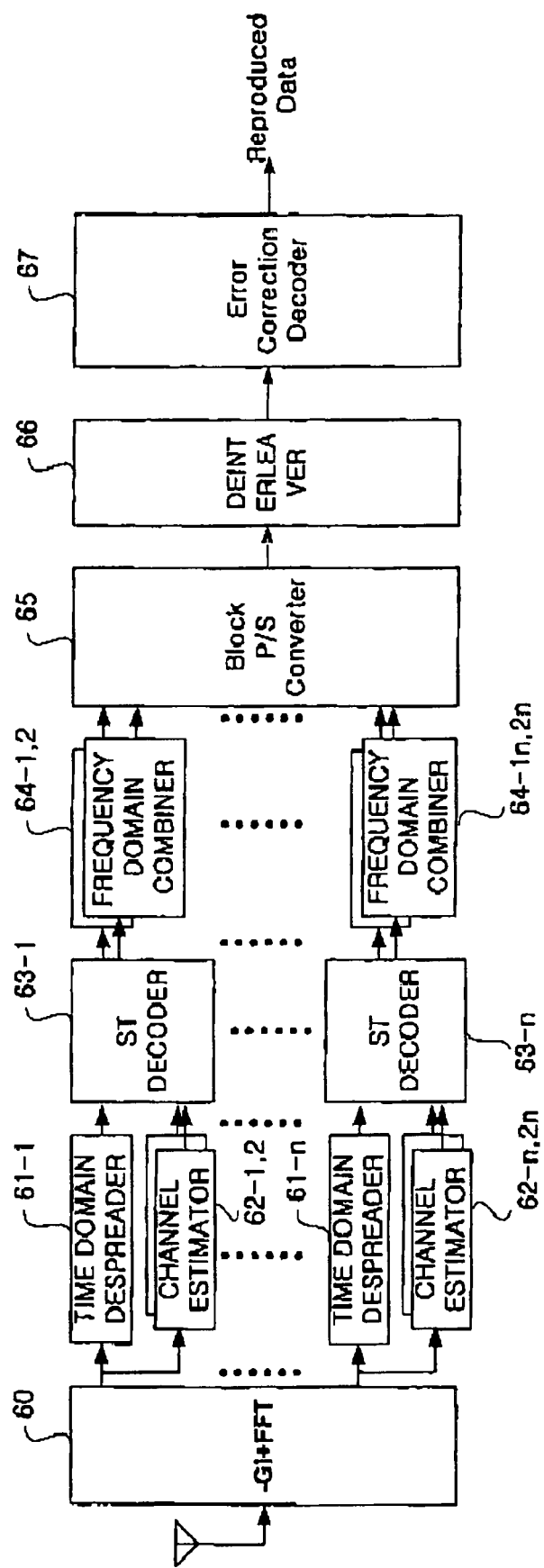
FIG. 6 is a block diagram illustrating a mobile station according to the first embodiment of the present invention.

As illustrated in FIG. 6, the mobile station 1 includes a space-time encoding device comprising a Guard Internal and fast Fourier transformer (GI+FFT)60, time domain despreaders 61-1 to 61-n, channel estimators 62-1,2 to 62-n,2n, space-time decoders 63-1 to 63-n, frequency domain combiners 64-1,2 to 64-n,2n, a block P/S converter 65, a deinterleaver 66, and an error correction decoder 67. A signal received by the antenna 10 is provided to the GI+FFT 60. The GI+FFT 60 down-converts the received signal, removes a guard interval from the received signals, converts the signal to subcarrier signals through FFT, and outputs the signal to the time domain despreaders 61-1 to 61-n and the channel estimators 62-1,2 to 62-n,2n.

The channel estimators 62-1,2 to 62-n,2n remove pilot signal modulation phase components of despread signals, obtain estimates of channel responses, and output the estimates to the space-time decoders 63-1 to 63-n.

The time domain despreaders 61-1 to 61-n receive subcarrier signals, and generate replicas of pilot signals received from the transmit antennas using the pilot signals, spreading codes for pilot signals, and the obtained channel estimates. In addition, the time domain despreaders 61-1 to 61-n subtract the replicas of the received pilot signals from the Fourier-transformed subcarrier signals, and time-despread (i.e., despread in the time domain) the received subcarrier signals, from which the pilot signals have been subtracted, using spreading codes allocated to the user of the mobile station 1.

The space-time decoders 63-1 to 63-n despread the time-despread subcarrier signals, outputted from the despreaders 61-1 to 61-n, using the spreading codes being used by the user of the mobile station 1. The space-time decoders 63-1 to 63-n also perform time-space decoding of the signals using the channel estimates. The frequency domain combiners 64-1,2 to 64-n,2n frequency-combine (i.e., combine in the frequency domain) the space-time decoded signals received from the space-time decoders 63-1 to 63-n, and output the frequency-combined signal to the block P/S converter 65.

The block P/S converter 65 performs block parallel-to-serial conversion of the frequency-combined signal received from the frequency domain combiners 64-1,2 to 64-n,2n, and outputs the converted signal to the deinterleaver 66. The deinterleaver 66 receives the converted signal output from the block P/S converter 65, and outputs the received signal to the error correction decoder 67, after reordering data of the signal in the opposite manner of the interleaver 23. The error correction decoder 67 performs error correction of the signal output from the deinterleaver 66 to obtain reproduced data.

The operation of the beamspace-time transmit diversity system according to the first embodiment of the present invention will now be described with reference to the drawings.

As illustrated in FIG. 1, if the base station 2 radiates first to fourth beams #1 to #4 through the transmit antenna array 20, the mobile station 1 receives the radiated beams #1 to #4 through the antenna 10, and the received beams are provided from the antenna 10 to the channel estimators 12-1 to 12-4 through the switch 11. The channel estimators 12-1 to 12-4 despread the received signals to estimate channel responses, and then output the estimated channel responses to the power calculators 13-1 to 13-4.

The power calculators 13-1 to 13-4 calculate powers of the channel responses, and add the calculated powers over all subcarriers to estimate respective powers from the beams. Each of the adders 14-1 to 14-4 adds respective channel response powers of two neighboring beams corresponding to each adder and outputs the sum of the two channel response powers to the largest beam-pair power sum detector 15.

The largest beam-pair power sum detector 15 compares the four beam-pair power sums received respectively from the four adders 14-1 to 14-4 to determine the largest of the four beam-pair power sums. The largest beam-pair power sum detector 15 outputs a beam pair index corresponding to the determined largest beam-pair power sum, and respective power estimates of a plurality of beams represented by the beam pair index, to the power difference comparator 16. In this manner, two neighboring beams, which provide the largest channel response power sum, are selected from a plurality of beams (four beams in this example).

The power difference comparator 16 obtains the difference between respective channel response powers of the two selected beams, and outputs information as to whether the difference is lower than a predetermined threshold to the single/multi-beam selector 17. More specifically, the power difference comparator 16 receives a beam pair index and respective power estimates of a plurality of beams represented by the beam pair index, and compares the difference between the received power estimates with a predetermined threshold, and then outputs the compared result to the single/multi-beam selector 17.

The single/multi-beam selector 17 selects the two beams, if the power difference calculated by the power difference comparator 16 is lower than the predetermined threshold, and selects, as a single beam for use, only one of the two beams, which has a larger power than the other, if the power difference is equal to or greater than the predetermined threshold. In other words, the single/multi-beam selector 17 receives the compared result of the difference between the power estimates of the plurality of beams represented by the beam pair index, selects a single beam or multiple beams of the plurality of beams according to the compared result, and outputs a beam index, which corresponds to the selected beam or beams, to the antenna 10 through the switch 11. The antenna 10 sends the beam index to the base station 2.

The base station 2 performs error correction encoding, modulation signal point mapping of transmission data randomizes the order of data transmission through the interleaver 23, and space-time encodes the signal output from the interleaver 23 with the orthogonal space-time coding matrix of two rows and two columns described above. Additionally, the base station 2 allocates the space-time coded signal to one beam or multiple beams represented by a selected beam index received from the mobile station 1.

If the mobile station 1 appoints one beam (i.e., if the selected beam index represents that a single beam is selected), the two beams represented by the index are the same. Such a beam index may have a format such as (#1, #1), (#2, #2), (#3, #3), or (#4, #4).

The beamspace-time transmit diversity system described above has the following advantages. First, if orthogonal pilot signals are allocated to beams, or if pilot signals are multiplexed after being spread with orthogonal spreading codes, the mobile station 1 (or the receiving side) can estimate a channel response from each beam.

In addition, by calculating the power of the channel response estimate, the mobile station 1 can detect the range of beams where the mobile station 1 is located.

Further, in the first embodiment, the base station 2 allocates space-time coded signals, encoded with an orthogonal space-time coding matrix of two rows and two columns, to two neighboring beams or a single beam. The mobile station 1 (or the receiving side) calculates the sum of powers of the channel estimates from neighboring beams to detect a beam-pair index representing two neighboring beams that provide the largest beam-pair power sum.

Further, if the difference between channel response powers from the two beams selected in the mobile station 1 is large, the mobile station can select one of the two beams to use. In this case, the selected beam index (i.e., beam selection information) is sent to the base station 2 in the uplink. As a result, the base station 2 identifies which beam is to be assigned to each mobile station 1.

Figure 7:
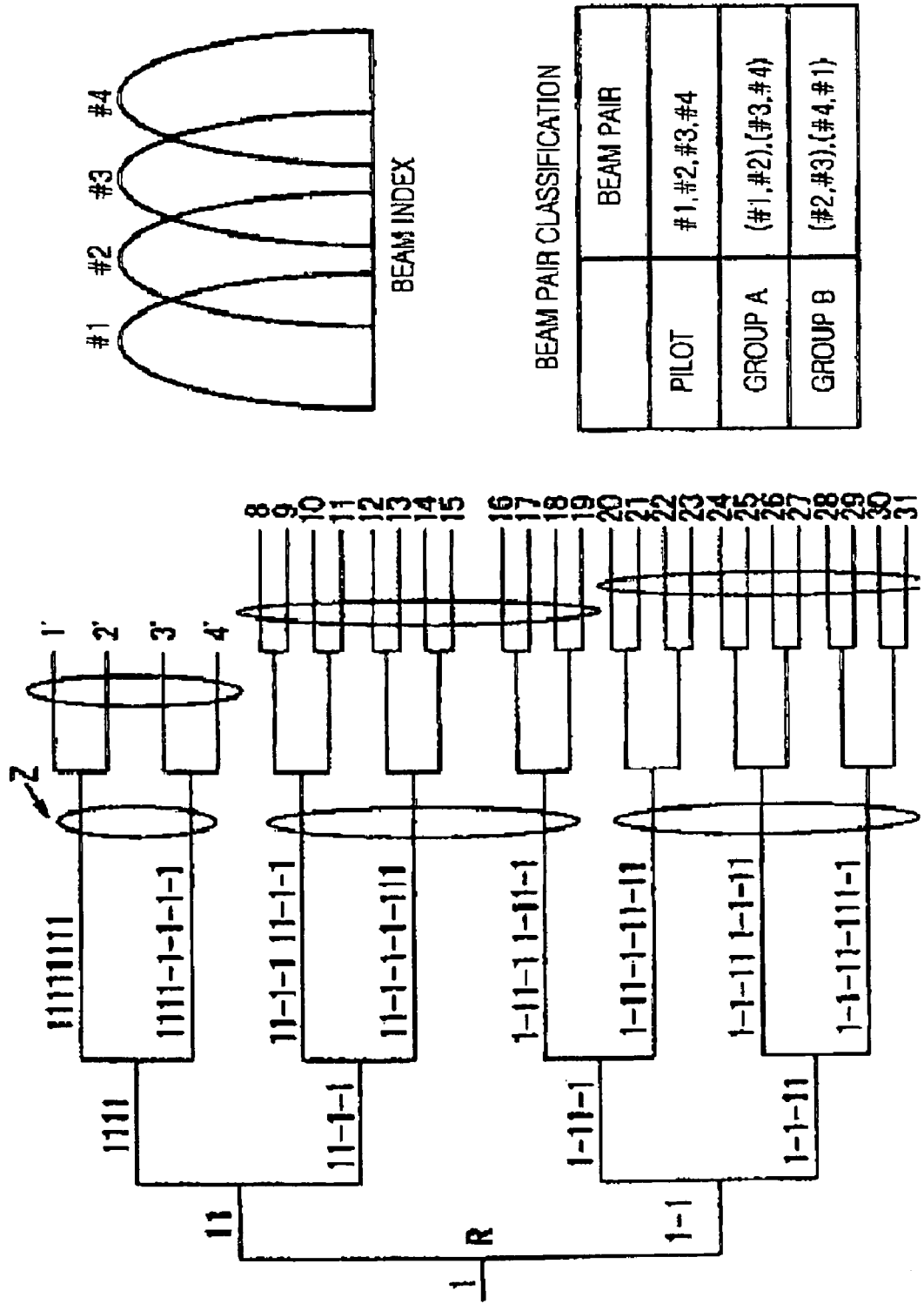
FIG. 7 is a conceptual diagram illustrating generating and allocating spreading codes to user signals and pilot signals when two beams are selected, according to the first embodiment of the present invention.

Assuming that beams are assigned to groups A and B as illustrated in a beam pair classification table in FIG. 7, for example, if spreading codes, having a spreading factor twice the time-domain spreading factor, are allocated to a pilot signal, beams used by the same group are allocated spreading codes corresponding to leaves generated respectively from one set of nodes among a plurality of nodes having the same time domain spreading factor (see "Z" in FIG. 7) in a Walsh spreading code tree. Because the spreading codes having the spreading factor twice the above time domain spreading factor are allocated to the pilot signals, 16-bit spreading codes 1' to 4' are allocated to pilot signals other than signals for users of the groups A and B.

Two space-time coded symbol sequences are steered to a beam or beams appointed by the mobile station from multiple beams, and then the symbol sequences are beam-multiplexed. The beam-multiplexed symbol sequences are serial-to-parallel converted at each transmit antenna branch, and then allocated to spreading segments. At each spreading segment, Walsh codes are used to perform two-dimensional spreading in both the time domain and the frequency domain, and the symbols are multiplexed with signals of the other users. The spreading codes, which can be used according to a beam pair as illustrated in FIG. 7, are used. A pilot signal for each beam is spread in the time domain with spreading codes having a spreading factor twice the time-domain spreading factor, and then multiplexed with the spread data.

Figure 8:
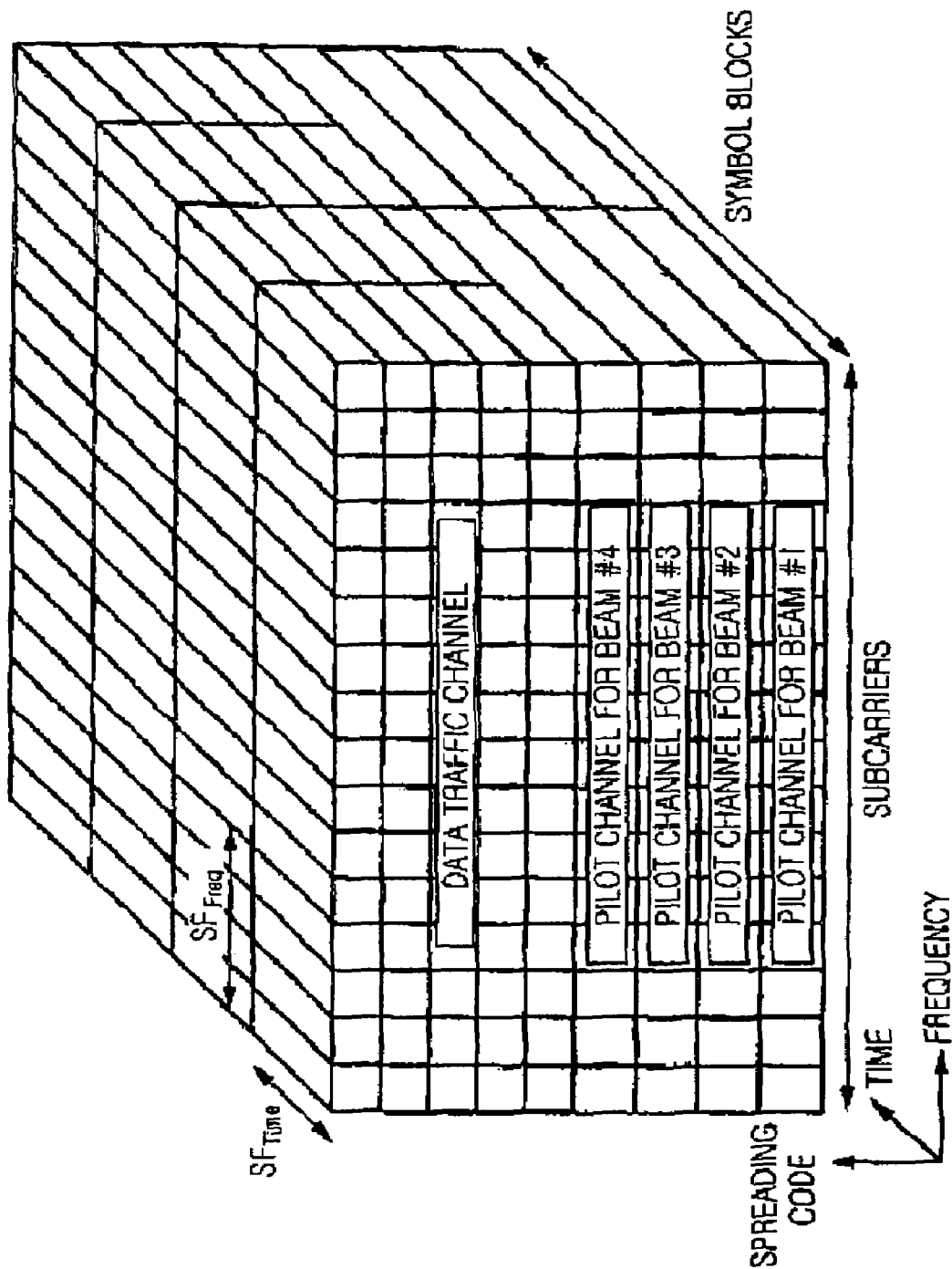
FIG. 8 is a diagram illustrating a spread signal frame according to the first embodiment of the present invention.

As illustrated in FIG. 8, the pilot signals and the signals of the other users are multiplexed after being spread at each spreading segment ($SF_{Time} \times SF_{Freq}$) in the Ns symbol×Nc subcarrier range (Ns is the number of symbols and Nc is the number of subcarriers).

Figure 9:
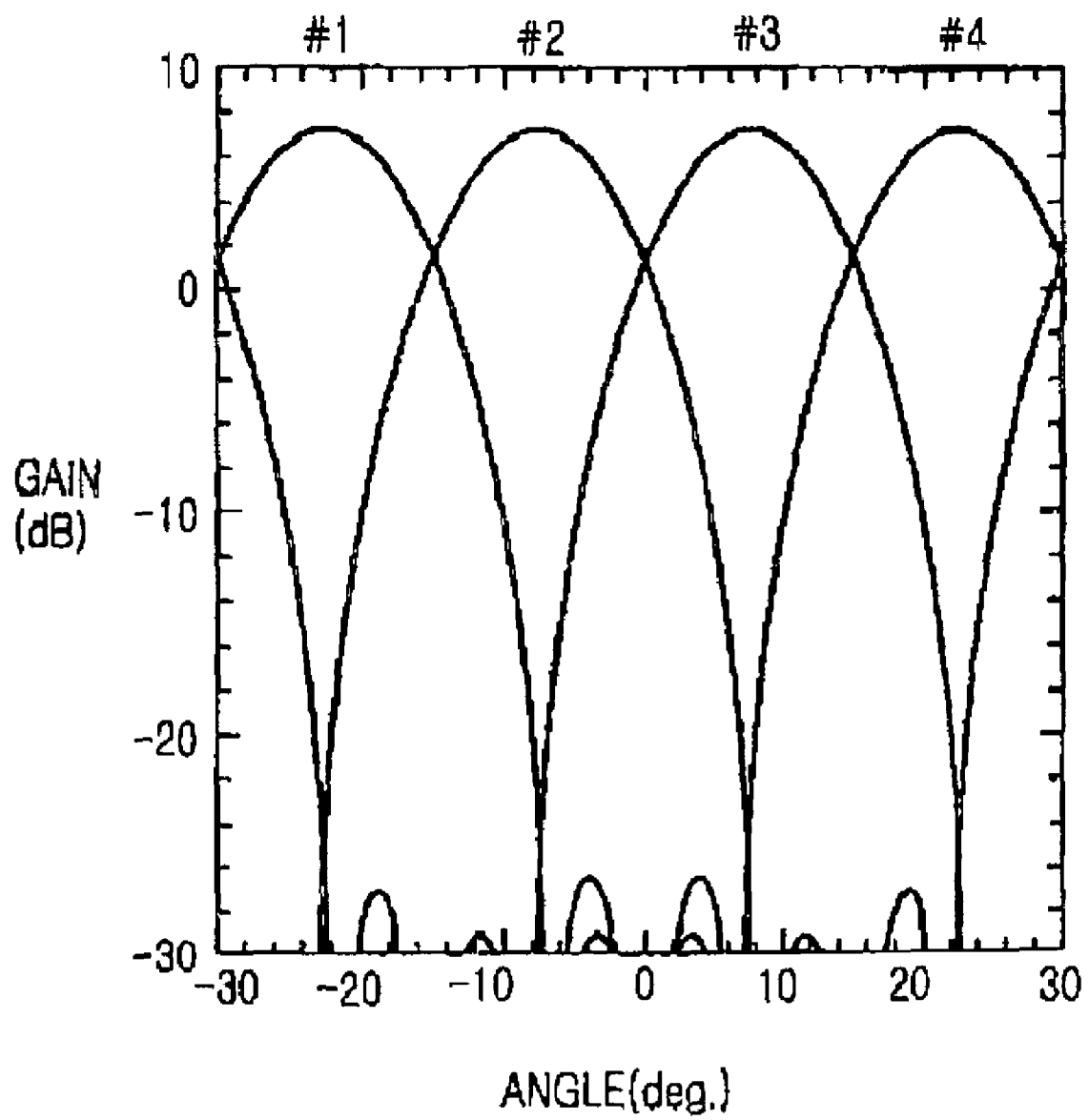
FIG. 9 is a graph illustrating a fixed multibeam pattern having low sidelobes according to the first embodiment of the present invention.

These subcarrier signals are OFDM multiplexed and converted to time domain signals through Inverse Fast Fourier Transformation (IFFT). A guard interval (GI) is added to the time domain signal, which is up-converted to a carrier frequency and then transmitted through the transmit antenna array 20 (see a beam pattern of fixed multiple beams shown in FIG. 9).

The mobile station 1 (or the receiving side) converts received signals to received subcarrier signals through fast Fourier transformation. The received subcarrier signals are time-despread using spreading codes at each subcarrier, to which pilot signals for beams are allocated. Pilot signal modulation components are removed from the despread signals to obtain channel estimates from the beams.

The received signals are time-despread using spreading codes allocated to the user to suppress signal components causing interference. Next, the signals are space-time decoded, and the decoded signals are combined in the frequency domain. The despread signals are deinterleaved and then error-correction decoded to obtain a reproduced bit sequence.

As described above, in the conventional spreading code allocation scheme, user signals that share a common beam and use different beam pairs may interfere when space-time codes are decoded. To overcome this problem, spreading codes generated from the same set of nodes are allocated in the manner as described above, considering that the spreading codes generated from the same set of nodes have a partial correlation of 0. Such spreading code allocation enables the receiver to suppress interfering user signals through time-domain despreading. The present invention has an advantage that no interference occurs when space-time codes are decoded.

Additionally, in the spreading code allocation, different sets of spreading codes generated from a plurality of nodes having the same time domain spreading factor are preferably allocated to a plurality of users that are using the same beam pair. For example, one set of spreading codes 0, 4, 8, and 12 are preferentially allocated, and as the number of users increases, another set of spread codes 2, 6, 10, and 14 are subsequently allocated in a sequential manner. This enables the receiver to suppress signals of the other users through time-domain despreading. Therefore, it is possible to prevent interference between spreading codes during frequency domain combination.

As is apparent from the above description, a beamspace-time transmit diversity system according to the first embodiment of the present invention also has the following advantages. In a transmission scheme, in which a transmit multibeam array is used in conjunction with space-time encoding in an OFDM-CDM system employing two-dimensional spreading, a transmitting side performs spreading code allocation to enable a receiving side to suppress signals causing interference when space-time codes are decoded, through time-domain despreading, thereby preventing the interference. As a result, it is possible to improve transmission characteristics and system performance.

The first embodiment of the present invention has been described with reference to the case where, in the beamspace-time transmit diversity system, the mobile station 1 generates a selected beam index based on power estimates, and the base station 2 performs spreading code allocation control based on the selected beam index, but the present invention is not limited thereto. For example, it is also possible that the mobile station 1 calculates and transmits power estimates to the base station 2, and the base station 2 generates a selected beam index based on the power estimates and performs spreading code allocation control based on the selected beam index.

Each of the transmitters and receivers in the mobile and base stations 1 and 2 includes a computer system therein. Procedures for performing the above-described system operations, such as space-time encoding, the space-time decoding, and the beam index selection, may be stored in the form of a program in a computer-readable recording medium. The computer can perform the operations by reading the program stored in the medium.

For example, to operate or implement each processing means or element in the transmitters and receivers of the mobile and base stations 1 and 2 described above, a central processing unit (CPU) in each of the transmitters and receivers reads the program from a main memory such as a ROM or a RAM to perform processing and calculation of information of the program.

The computer-readable recording medium includes a magnetic disk, a magneto-optical disk, a CD-ROM, a DVD-ROM, a semiconductor memory, etc. Such a program may also be transmitted to the computer via a communication line, whereby the computer executes the transmitted program.

Second Embodiment

Figure 10:
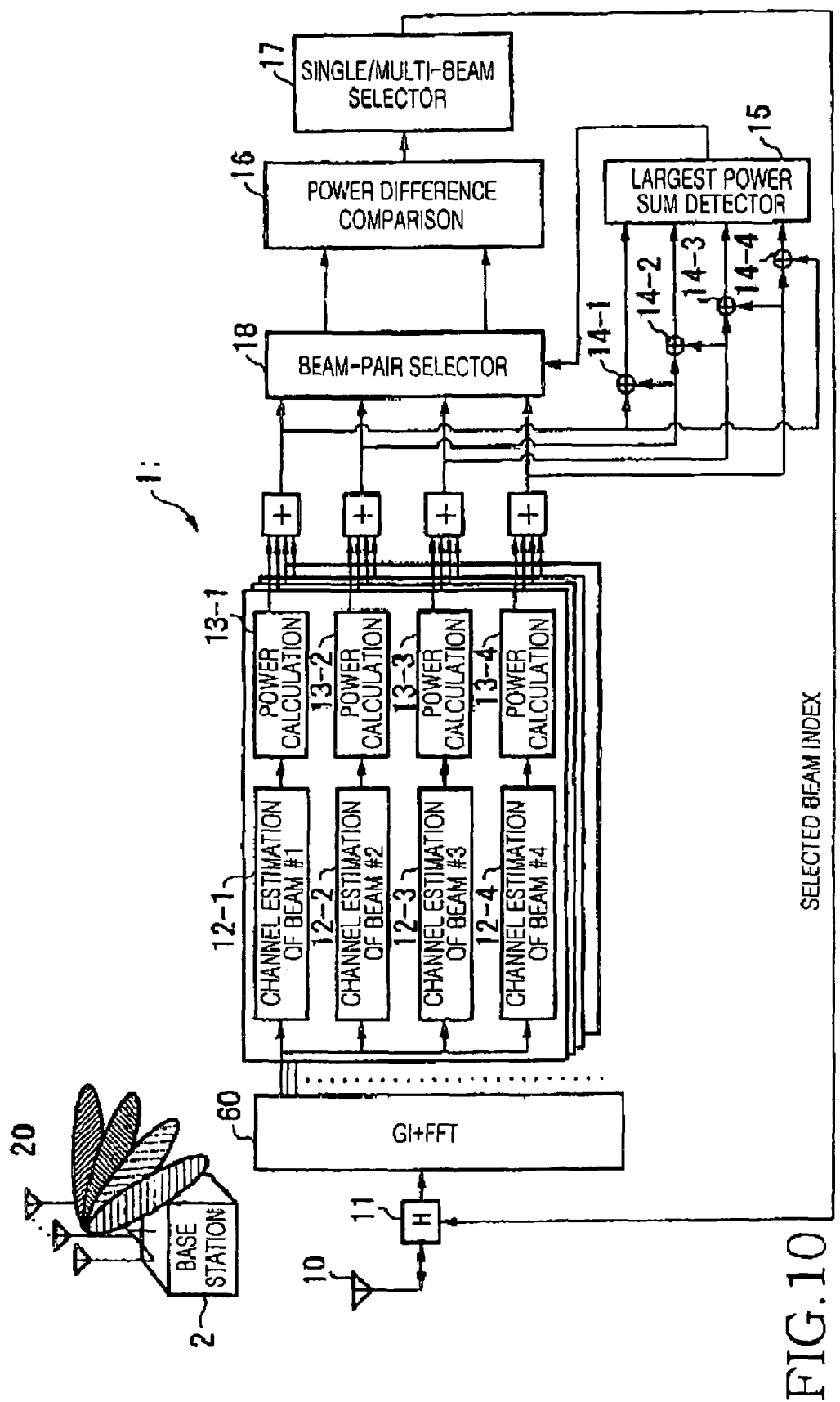
FIG. 10 is a block diagram illustrating a closed-loop beam selector in a mobile station according to a second embodiment of the present invention.

FIG. 10 is a block diagram illustrating a beamspace-time transmit diversity system according to a second embodiment of the present invention. As with the first embodiment, the beamspace-time transmit diversity system according to the second embodiment includes a mobile station (transceiver) 1 and a base station (transceiver) 2, and employs a closed-loop beam selection scheme.

The mobile station 1 is provided with a closed-loop beam selector including an antenna 10, a switch 11, first to fourth channel estimators 12-1 to 12-4, first to fourth power calculators 13-1 to 13-4, first to fourth adders 14-1 to 14-4, a largest beam-pair power sum detector 15, a beam-pair selector 18, a power-difference comparator 16, and a single/multi-beam selector 17.

The antenna 10 receives a plurality of beams (first to fourth beams #1 to #4 in this embodiment) radiated from a transmit antenna array 20 in the base station 2, and outputs the received signals to the switch 11, and also radiates a selected beam index input from the switch 11. The switch 11 outputs the received signals input from the antenna 10 to the channel estimators 12-1 to 12-4, and also outputs a selected beam index input from the single/multi-beam selector 17 to the antenna 10. The switch 11 switches the input/output operating modes according to a control command from a controller (not shown).

A GI+FFT 60 receives the signals received through the antenna 10, and removes guard intervals (GI) from the received signal after down conversion. The GI+FFT 60 converts the received signals to subcarrier signals through FFT, and outputs the subcarrier signals, i.e., beams #1 to #4) to the channel estimators 12-1 to 12-4, respectively.

The channel estimators 12-1 to 12-4 despread the subcarrier signals input from the GI+FFT 60 using spreading codes of each subcarrier. Pilot signal modulation components are removed from the despread signals to estimate channel responses (described below). The channel estimators 12-1 to 12-4 output the estimated channel responses to the power calculators 13-1 to 13-4.

The power calculators 13-1 to 13-4 calculate powers of the channel responses input from the channel estimators 12-1 to 12-4, and add the calculated powers over all subcarriers to estimate respective powers from the beams and output the estimated powers to the adders 14-1 to 14-4 and to the beam pair selector 18. That is, the first power calculator 13-1 outputs an estimated power $P_1$ of beam #1 to the first and fourth adders 14-1 and 14-4 and to the beam pair selector 18. The second power calculator 13-2 outputs an estimated power $P_2$ of beam #2 to the first and second adders 14-1 and 14-2 and to the beam pair selector 18. The third power calculator 13-3 outputs an estimated power $P_3$ of beam #3 to the second and third adders 14-2 and 14-3 and to the beam pair selector. The fourth power calculator 13-4 outputs an estimated power $P_4$ of beam #4 to the third and fourth adders 14-3 and 14-4 and to the beam pair selector 18.

Each of the adders 14-1 to 14-4 adds two corresponding powers of the estimated powers $P_1$ to $P_4$ of the beams #1 to #4, input from the power calculators 13-1 to 13-4, and outputs the sum of the powers to the largest beam-pair power sum detector 15. In other words, the first adder 14-1 receives the power estimates $P_1$ and $P_2$ of the beams #1 and #2, and outputs the sum of the power estimates ($P_1+P_2$) to the largest beam-pair power sum detector 15. The second adder 14-2 receives the power estimates $P_2$ and $P_3$ of the beams #2 and #3, and outputs the sum of the power estimates ($P_2+P_3$) to the largest beam-pair power sum detector 15. The third adder 14-3 receives the power estimates $P_3$ and $P_4$ of the beams #3 and #4, and outputs the sum of the power estimates ($P_3+P_4$) to the largest beam-pair power sum detector 15. The fourth adder 14-4 receives the power estimates $P_4$ and $P_1$ of the beams #4 and #1, and outputs the sum of the power estimates ($P_4+P_1$) to the largest beam-pair power sum detector 15.

The largest beam-pair power sum detector 15 receives and compares the four beam-pair power sums $P_1+P_2$, $P_2+P_3$, $P_3+P_4$, and $P_4+P_1$ to determine the largest of the four beam-pair power sums. The largest beam-pair power sum detector 15 outputs a beam pair index corresponding to the determined largest beam-pair power sum to the power difference comparator 16.

Here, a beam pair index represents a combination of beams corresponding to a beam-pair power sum. For example, if the power sum $P_1+P_2$ is the largest power sum, a corresponding beam pair index is defined as (beam #1, #2) representing a combination of beams #1 and #2. Beam-pair indices are defined for the other beam-pair power sums in the same manner.

The beam-pair selector 18 receives the power estimates P1 to P4 from the power calculator 13-1 to 13-4, receives the beam pair index from the largest beam-pair power sum detector 15, and outputs the beam pair index and respective power estimates of a plurality of beams (two beams in this example) represented by the beam pair index, to the power difference comparator 16.

The power estimates output from the largest beam-pair power sum detector 15 are respective power estimates of a plurality of beams (two beams in this example) corresponding to the beam pair index output from the largest beam-pair power sum detector 15. For example, if the largest beam-pair power sum detector 15 outputs a beam pair index (beam #1, #2), the power estimates output from the largest beam-pair power sum detector 15 are respective power estimates $P_1$ and $P_2$ of a plurality of beams corresponding to the beam pair index (beam #1, #2).

The power difference comparator 16 receives a beam pair index and respective power estimates of a plurality of beams represented by the beam pair index, compares the difference between the received power estimates with a predetermined threshold, and outputs the compared result to the single/multi-beam selector 17.

The single/multi-beam selector 17 receives the compared result of the difference between the power estimates of the plurality of beams represented by the beam pair index, selects a single beam or multiple beams of the plurality of beams according to the compared result, and outputs a beam index corresponding to the selected beam or beams, to the switch 11. If the power difference is equal to or larger than the predetermined threshold, the single/multi-beam selector 17 selects only one of the plurality of beams that has the largest power estimate. However, if the power difference is smaller than the predetermined threshold, the single/multi-beam selector 17 selects all of the plurality of beams represented by the beam pair index.

Figure 11:
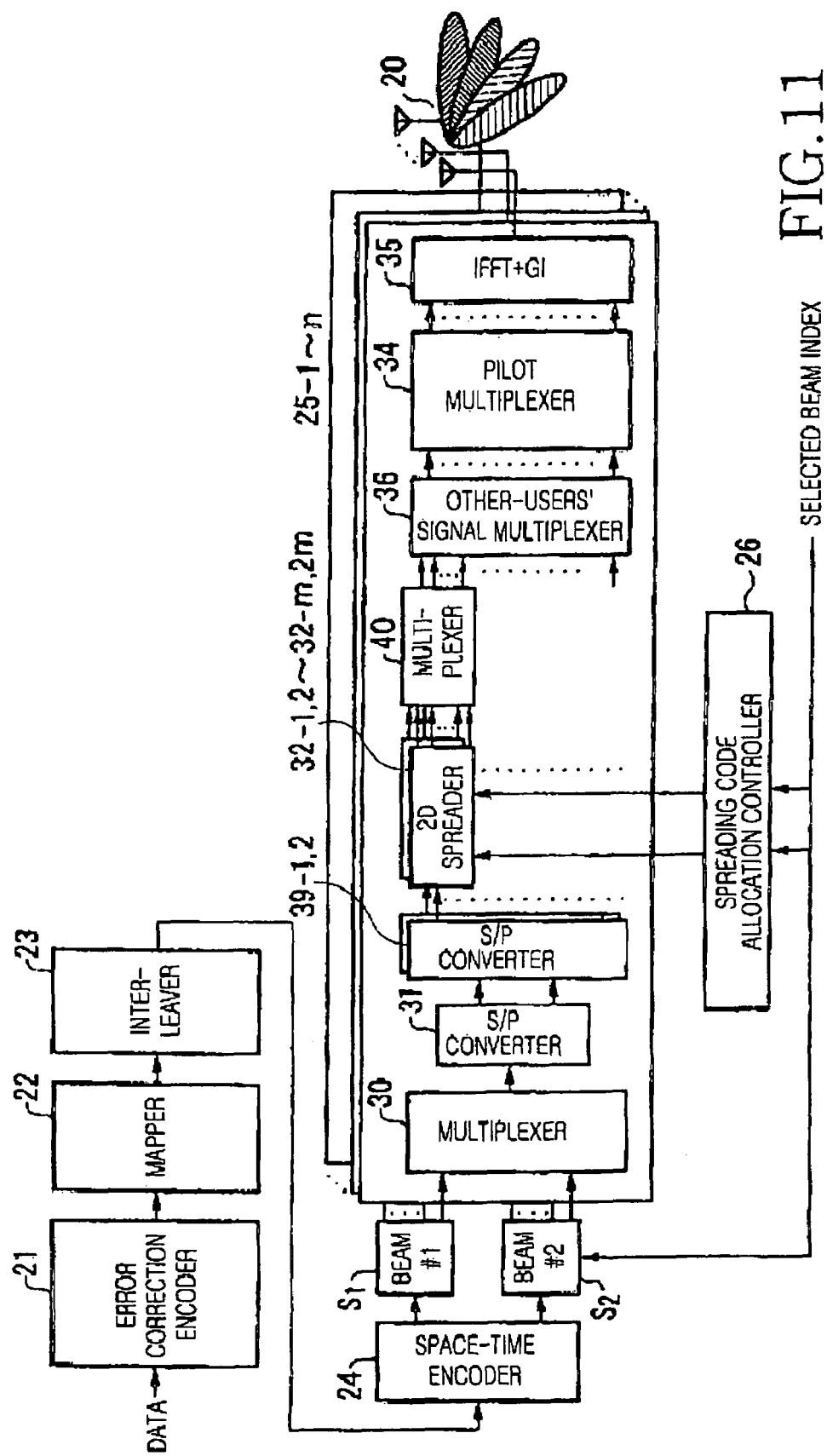
FIG. 11 is a block diagram illustrating a base station according to the second embodiment of the present invention.

FIG. 11 is a block diagram illustrating a base station according to the second embodiment of the present invention. As illustrated in FIG. 11, the base station 2 includes a transmit antenna array 20, an error correction encoder 21, a mapper 22, an interleaver 23, a space-time encoder 24, antenna branches 25-1 to 25-$n$ ($n$ is a natural number), and a spreading code allocation controller 26. The error correction encoder 21 receives data for transmission, and outputs the data to the mapper 22, after error correction encoding. The mapper 22 receives the error correction coded data, and outputs it to the interleaver 23, after modulation constellation mapping. The interleaver 23 receives the mapped data and outputs it to the space-time encoder 24, after reordering of the data to spread burst errors.

The space-time encoder 24 space-time encodes the signal output from the interleaver 23 with the 2×2 orthogonal space-time coding matrix shown in Equation 1. The space-time encoder 24 outputs the space-time coded signal, after allocating it to a beam or beams represented by a selected beam index received from the mobile station 1.

In the second embodiment, the base station 1 receives, for example, a beam-pair index representing selected beams #1 and #2, and the space-time encoder 24 allocates the space-time coded signal to the beams #1 and #2, which are then output to the corresponding antenna branches 25-1 to 25-$n$.

Each of the antenna branches 25-1 to 25-$n$ includes a multiplexer 30, S/P converter 31, 39-1 and 39-2, two-dimensional spreaders 32-1,2 to 32-$m$,2$m$ ($m$ is a natural number), a multiplexer 40, an other-users signal multiplexer 36, a pilot signal multiplexer 34 and an Inverse Fast Fourier Transformer (=IFFT+GI) 35.

The multiplexer 30 receives the space-time coded signal allocated by the space-time encoder 24 to the beams represented by the selected beam index, and multiplexes and outputs the beams to the S/P converter 31. In the present embodiment, for example, the multiplexer 30 multiplies the space-time coded transmission symbols by a corresponding array weight of the transmit antenna array 20 to multiplex the two beams #1 and #2.

The S/P converter 31 receives the beamspace-time coded symbols multiplexed with the plurality of beams (two beams in this example), and outputs two signals to the S/P converters 39-1 and 39-2 after performing serial-to-parallel conversion of the received symbols in units of two symbols. The two signals output from the S/P converter 31 correspond respectively to the time-domain signals output from the space-time encoder 24. Each of the S/P converters 39-1 and 39-2 serial-to-parallel converts a corresponding one of the two signals output from the S/P converter 31 to the same number of beamspace-time coded symbols for transmission as the number of spreading segments. The S/P converter 39-1 outputs its beamspace-time coded symbols respectively to the two-dimensional spreaders 32-1 to 32-$m$, and the S/P converter 39-2 outputs its beamspace-time coded symbols respectively to the two-dimensional spreaders 32-2 to 32-2m. The two-dimensional spreaders 32-1,2 to 32-$m$,2$m$ receive and allocate the serial-to-parallel converted beam-space-time coded symbols to spreading segments as illustrated in FIG. 3. The two-dimensional spreaders 32-1,2 to 32-$m$,2$m$ use Walsh codes at each spreading segment to perform two-dimensional spreading in both the time and frequency domains or directions, and output the spread signals to the multiplexers 40-1 to 40-$m$.

As illustrated in FIG. 3, the two-dimensional spreading segment is defined, as a spreading area, by the number ($SF_{Time}$) of OFDM symbols in the time domain and the number ($SF_{Freq}$) of subcarriers in the frequency domain. The two-dimensional spreaders 32-1,2 to 32-$m$,2$m$ use spreading codes of a spreading factor ($SF_{Time} \times SF_{Freq}$) (i.e., time domain spreading factor×frequency domain spreading factor) assigned by the spreading code allocation controller 26. First, the two-dimensional spreaders 32-1,2 to 32-$m$,2$m$ perform time domain spreading at a first subcarrier, and perform time domain spreading at a subcarrier adjacent to the first subcarrier. By repeating the time domain spreading in this manner, the two-dimensional spreaders 32-1,2 to 32-$m$,2$m$ perform two-dimensional spreading in both the time domain and the frequency domain.

The multiplexers 40-1 to 40-$m$ multiplex two symbols (in the time domain), output from each of the two-dimensional spreaders 32-1,2 to 32-$m$,2$m$, in the same spreading segment, and output the multiplexed symbols to the other-users signal multiplexer 36. For example, the multiplexer 40-1 multiplexes two symbols (in the time domain), output from the two-dimensional spreaders 32-1 and 32-2, in the same spreading segment, and outputs the multiplexed symbols to the other-users signal multiplexer 36.

The other-users signal multiplexer 36 receives the beam-space-time coded transmission symbols, which were two-dimensionally spread in the time and frequency domains, and multiplexes the symbols of a plurality of users and outputs the multiplexed data to the pilot signal multiplexer 34.

The pilot signal multiplexer 34 time-spreads (or spreads in the time domain) pilot signals for the beams, multiplexes the pilot signals with the spread data multiplexed with data of the other users, and outputs the additionally multiplexed data to the IFFT+GI 35.

The IFFT+GI 35 converts the received data to a time domain signal via Inverse Fast Fourier Transform (IFFT). The IFFT+GI 35 also adds a guard interval (GI) to the signal and performs up-conversion to a carrier frequency, and then outputs the converted signal to the transmit antenna array 20.

The transmit antenna array 20 includes a plurality of antennas (n antennas in this example) corresponding respectively to the antenna branches 25-1 to 25-$n$. The transmit antenna array 20 radiates a plurality of transmission signals received from the respective IFFT+GI 35 of the antenna branches 25-1 to 25-$n$.

When a single beam used by one user is the same as one of multiple beams used by another user, or one of multiple beams used by one user is the same as one of multiple beams used by another user, the spreading code allocation controller 26 allocates spreading codes, which provide a partial correlation of 0 in the time domain spreading to the beams. In addition, when a plurality of users use the same beam pair, the spreading code allocation controller 26 allocates spreading codes, which provide a partial correlation of 0 in the time domain spreading to the corresponding beams. The spreading code allocation controller 26 outputs the allocated spreading codes to each of the two-dimensional spreaders 32-1,2 to 32-$m$,2$m$.

As illustrated in FIG. 4, which illustrates how spreading codes are allocated, a user using a beam pair (#1, #2) and a user using a beam pair (#3, #4) belong to a group A, and a user using a beam pair (#2, #3) and a user using a beam pair (#4, #1) belong to a group B. If a path angular spread from the base station to each terminal is appropriately narrow, no interference occurs between signals allocated by beam division to different beam pairs in the same group. In addition, signals for a plurality of users in the same beam pair do not interfere with each other when space-time codes are decoded because the users use the same pair of beams. However, interference occurs between signals for different users who belong to different groups as described above (see Equations 8 and 9).

To prevent the interference, spreading codes are allocated to users (or beam pairs) in the following manner. Users (or beam pairs) belonging to the same group are allocated spreading codes corresponding to leaves generated respectively from one set of nodes among a plurality of nodes having the same time domain spreading factor (see "X" in FIG. 4) in a Walsh spreading code tree illustrated in FIG. 4. However, users (or beam pairs) belonging to different groups are allocated different sets of spreading codes corresponding to different sets of leaves generated respectively from different sets of nodes (of a root or a node closer to the root, compared to the time domain spreading factor X) in the Walsh spreading code tree illustrated in FIG. 4.

In the example of FIG. 4, 32-bit spreading codes 0 to 15 (see "A" in FIG. 4), which are leaves generated respectively from one set of nodes ($X_1$, $X_2$, $X_3$ and $X_4$) among a plurality of nodes $X_1$ to $X_8$ having the same time domain spreading factor (see "X" in FIG. 4), are allocated to users belonging to the group A (i.e., a user using the beam pair (#1, #2) and a user using the beam pair (#3, #4)). 32-bit spreading codes 16 to 32 (see "B" in FIG. 4), which are leaves generated respectively from nodes ($X_5$, $X_6$, $X_7$ and $X_8$) among the plurality of nodes $X_1$ to $X_8$ having the same time domain spreading factor (see "X" in FIG. 4), are allocated to users belonging to the group B (i.e., a user using the beam pair (#2, #3) and a user using the beam pair (#4, #1)).

In short, the spreading code allocation controller 26 allocates spreading codes according to the following rules.

1) Different sets of time-domain spreading codes, generated from different branches, are allocated to different groups.

2) Spreading codes generated from different branches in the time-domain spreading factor are allocated as two spreading codes to the same user.

3) If there are remaining spreading codes generated from different branches in the time-domain spreading factor, the remaining spreading codes are allocated to the other users who use the same beam pair.

4) The same spreading codes (in which there are no constraints) may be allocated to users who use different beam pairs in the same group.

Figure 12:
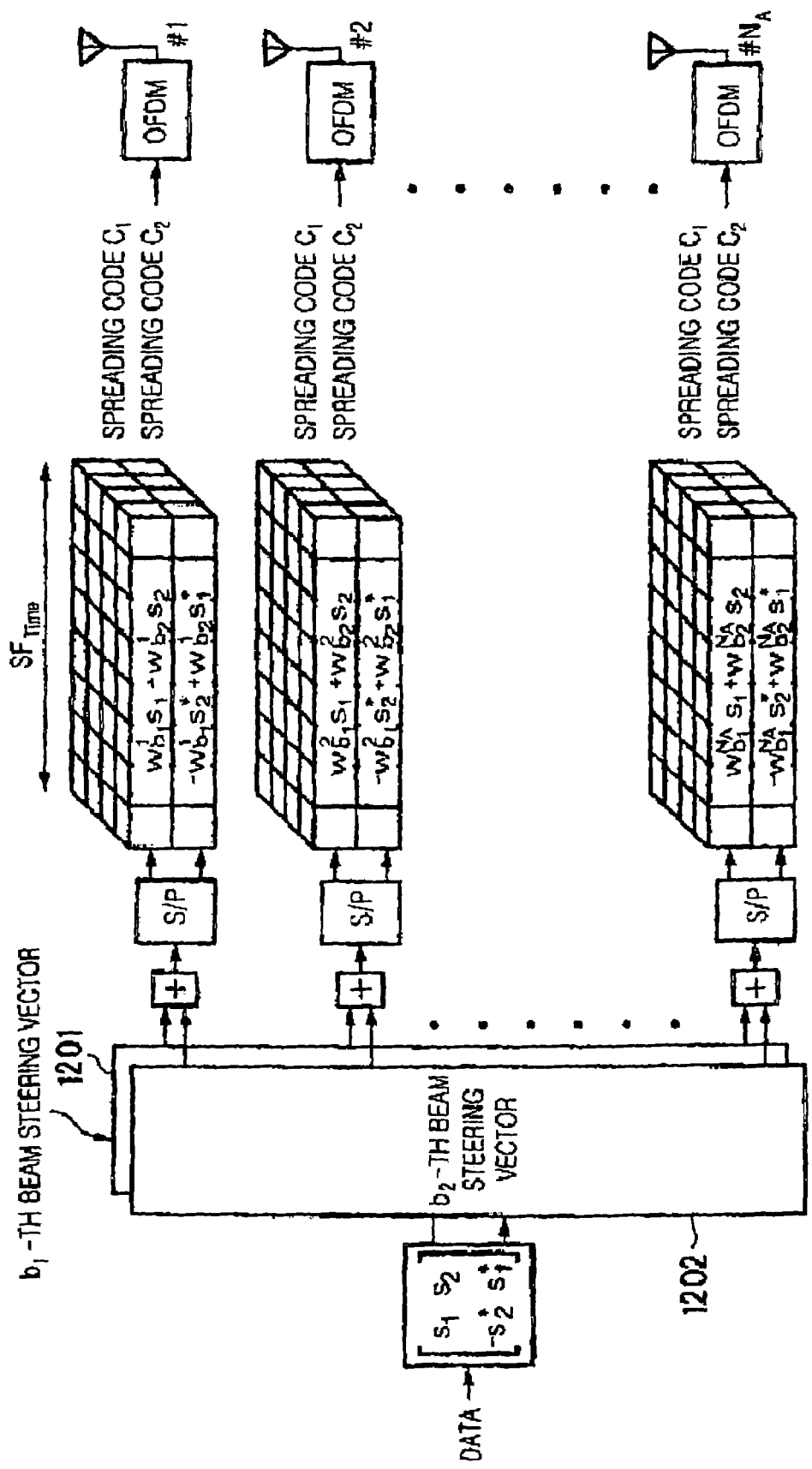
FIG. 12 is a conceptual diagram illustrating how a beamspace-time transmit diversity method is performed in the base station according to the second embodiment of the present invention.
Figure 13:
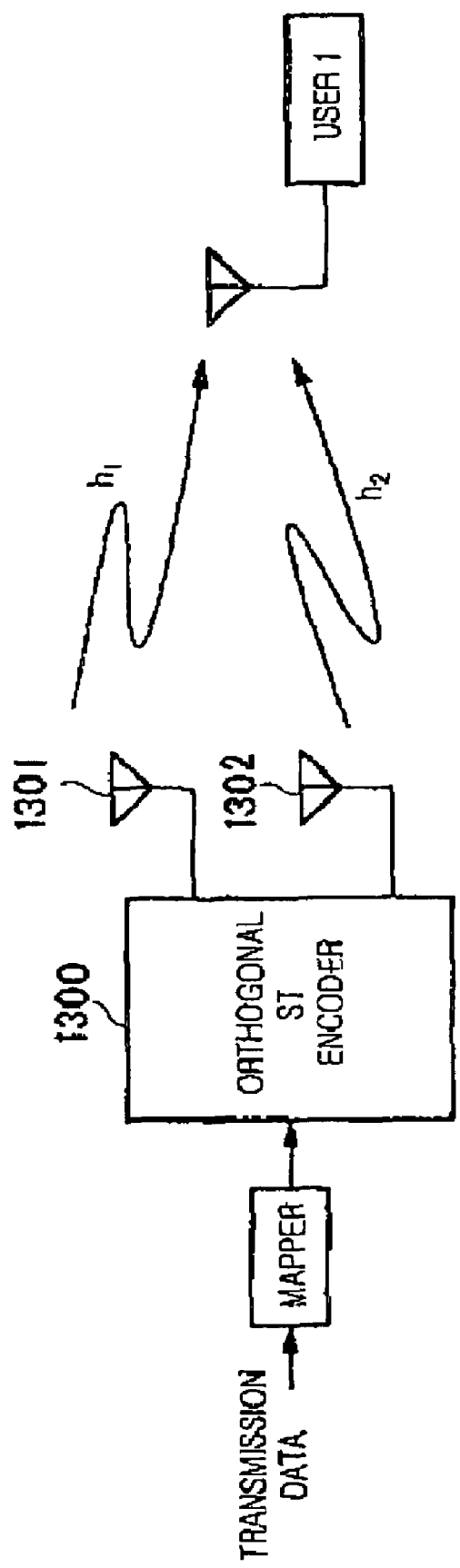
FIG. 13 is a block diagram illustrating a conventional transmit diversity system.
Figure 14:
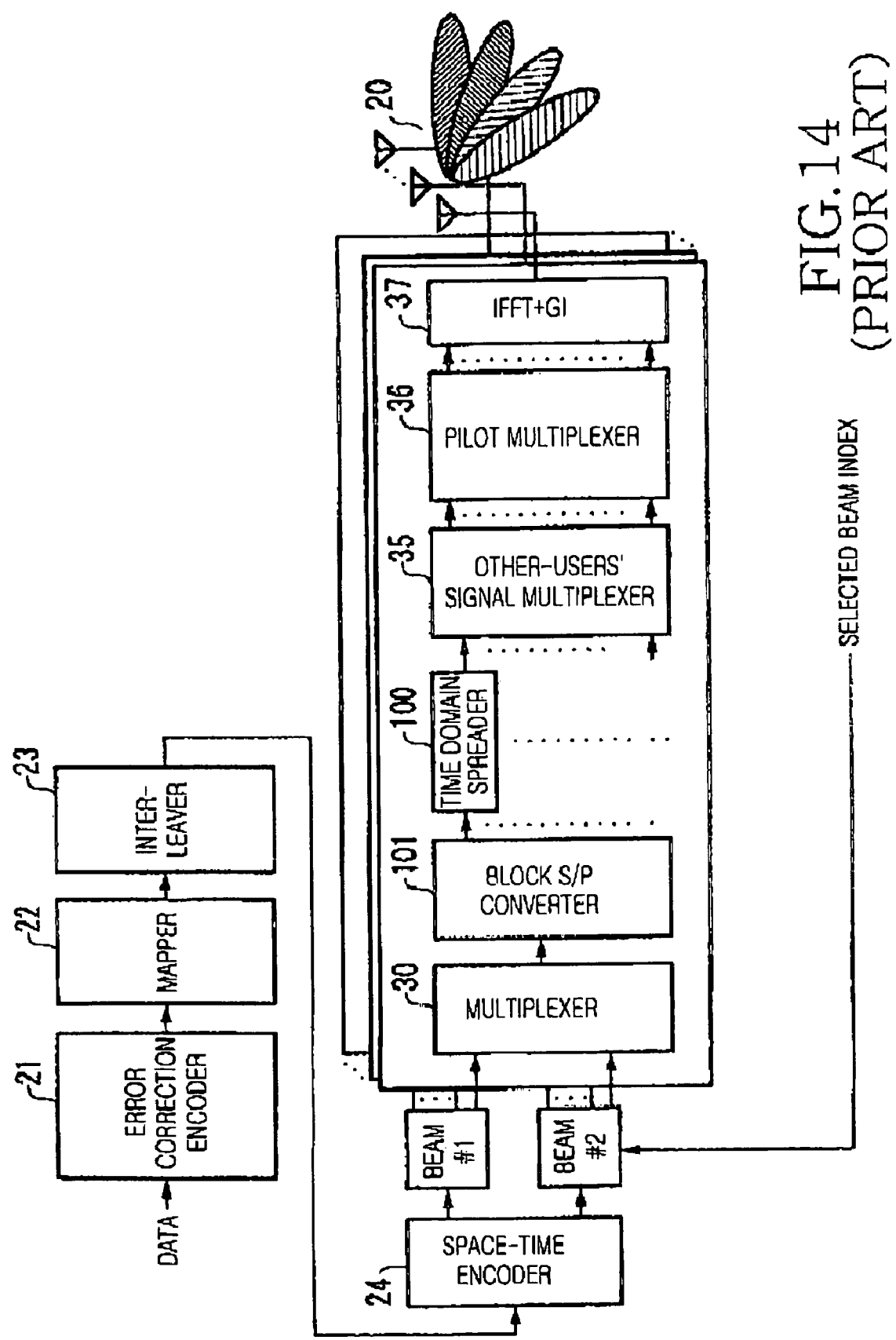
FIG. 14 is a block diagram illustrating a conventional beamspace-time diversity system for time-domain OFDM-CDM.
Figure 15:
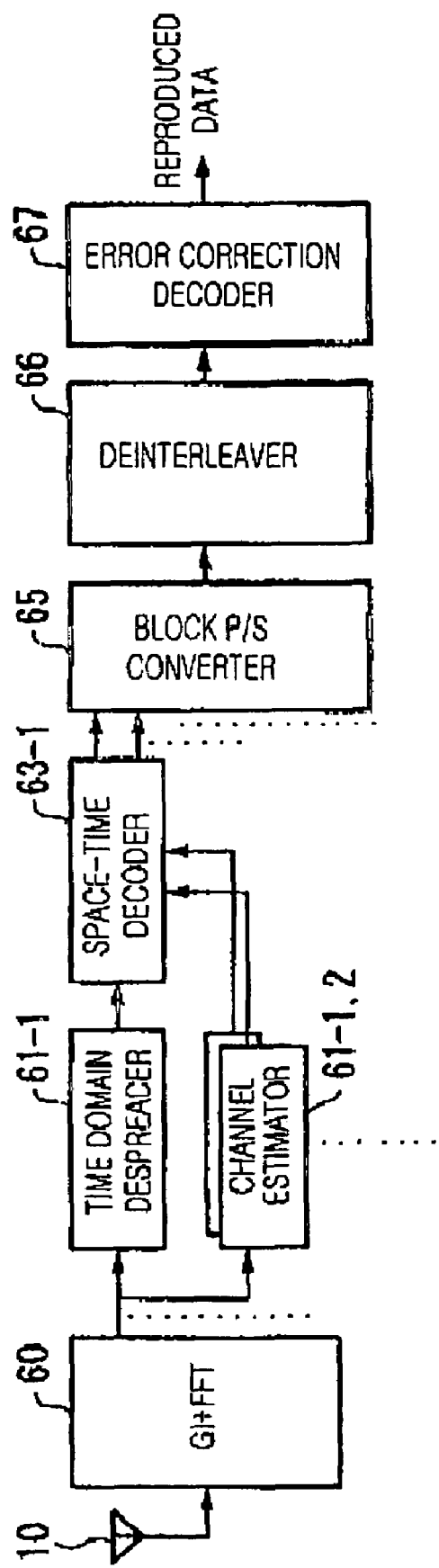
FIG. 15 is a block diagram illustrating a receiver in the conventional beamspace-time diversity system for time-domain OFDM-CDM.
Figure 16:
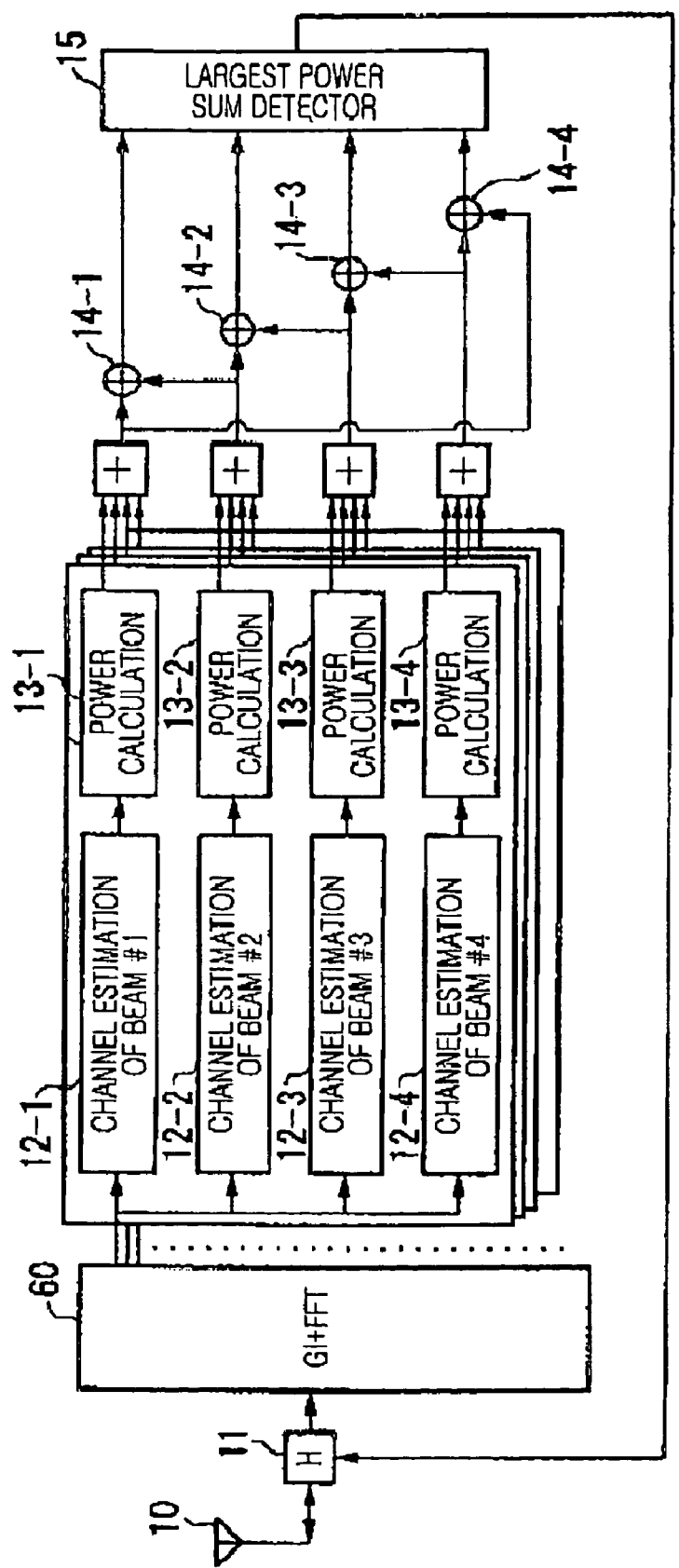
FIG. 16 is a block diagram illustrating a conventional closed-loop beam-pair selector.
Figure 17:
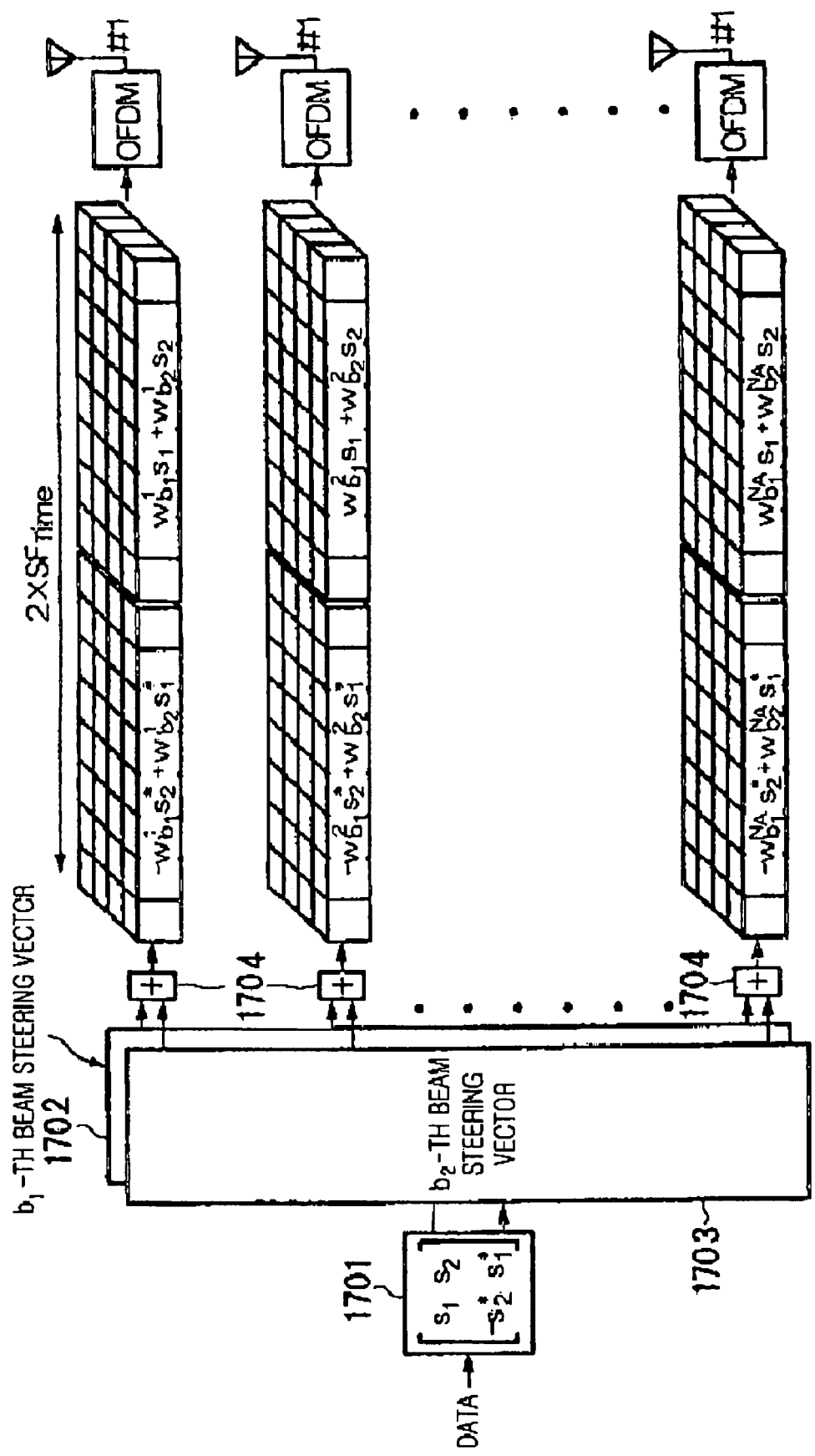
FIG. 17 is a conceptual diagram illustrating how space-time coded signals are allocated to spreading areas in the prior art.
Figure 18:
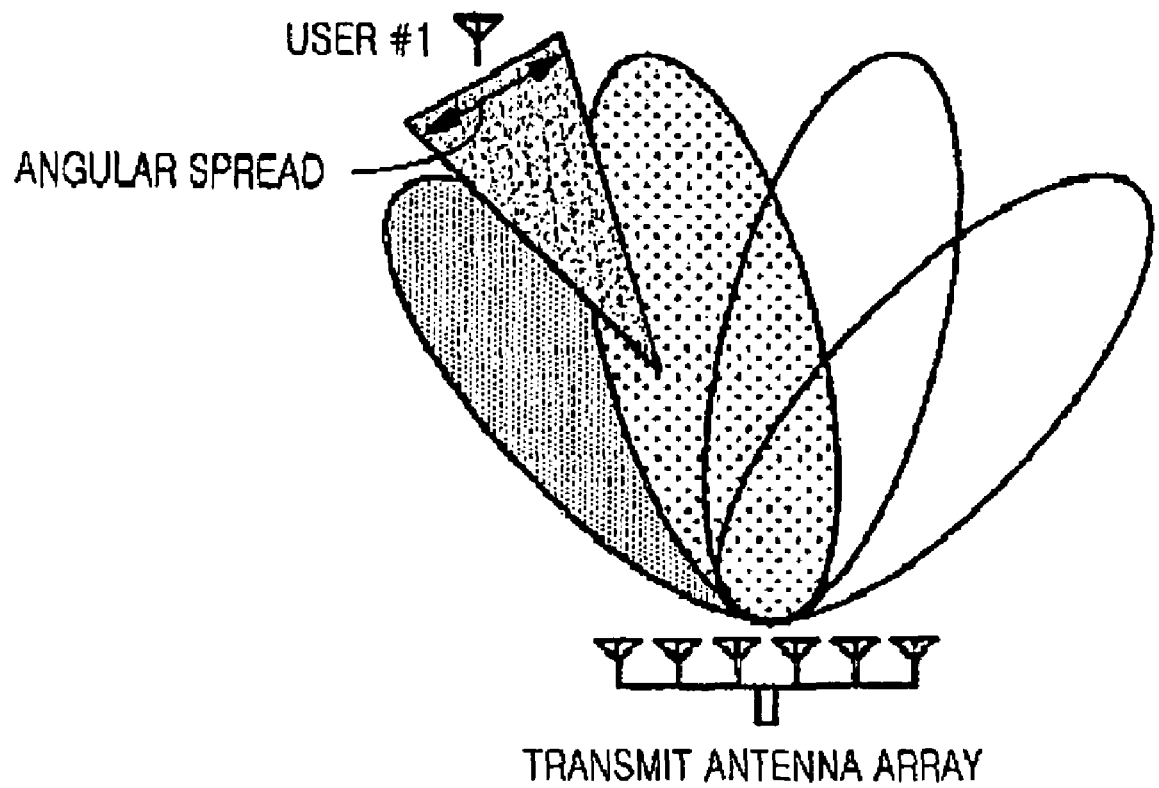
FIG. 18 is a conceptual diagram illustrating a relationship between the user location and beam areas with a wide angular spread.
Figure 19:
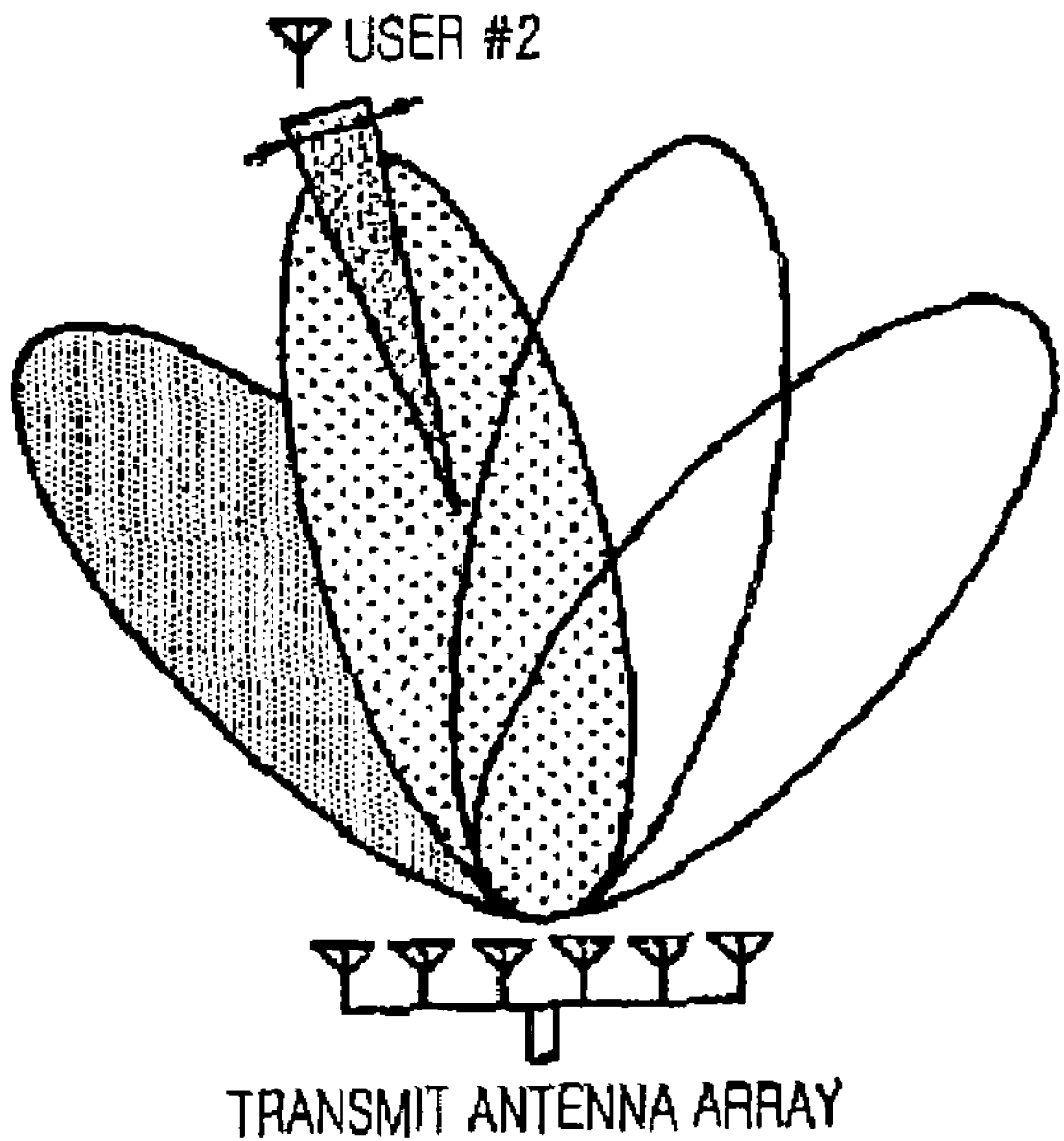
FIG. 19 is a conceptual diagram illustrating a relationship between the user location and beam areas with a narrow angular spread.
Figure 20:
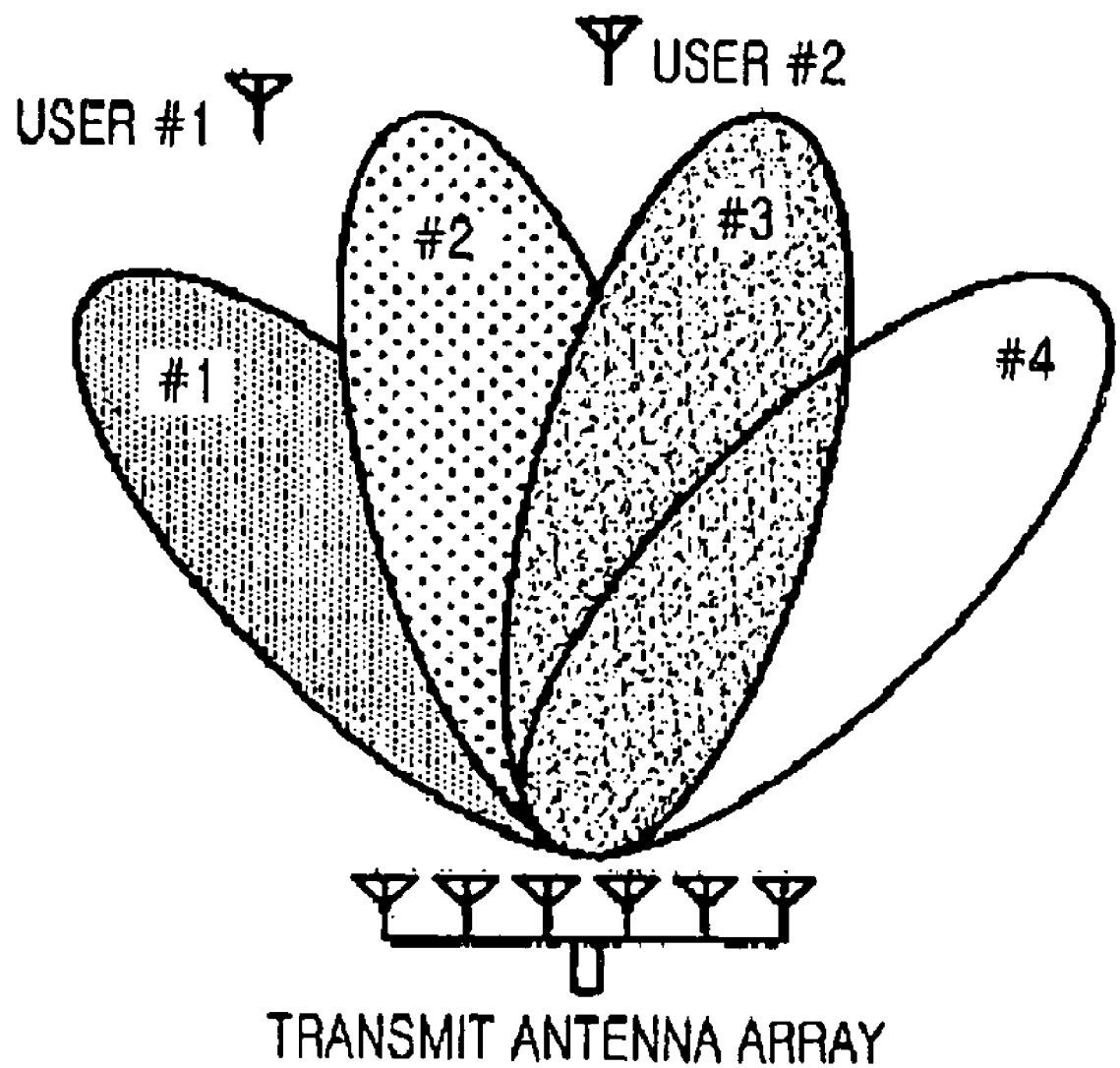
FIG. 20 is a conceptual diagram illustrating an example where two users use respective pairs of beams and share one beam.

FIG. 12 is a diagram illustrating how the base station 2 in the beamspace-time transmit diversity system according to the second embodiment performs a beamspace-time transmit diversity method.

As illustrated in FIG. 10, if the base station 2 radiates first to fourth beams #1 to #4 through the transmit antenna array 20, the mobile station 1 receives the radiated beams #1 to #4 through the antenna 10, and the received beams are provided from the antenna 10 to the channel estimators 12-1 to 12-4 through the switch 11. The channel estimators 12-1 to 12-4 despread the received signals to estimate channel responses, and then output the estimated channel responses to the power calculators 13-1 to 13-4.

The power calculators 13-1 to 13-4 calculate powers of the channel responses, and add the calculated powers over all subcarriers to estimate respective powers from the beams. Each of the adders 14-1 to 14-4 adds respective channel response powers of two neighboring beams corresponding to each adder and outputs the sum of the two channel response powers to the largest beam-pair power sum detector 15.

The largest beam-pair power sum detector 15 compares the four beam-pair power sums received respectively from the four adders 14-1 to 14-4 to determine the largest of the four beam-pair power sums. The largest beam-pair power sum detector 15 outputs a beam pair index corresponding to the determined largest beam-pair power sum, and respective power estimates of a plurality of beams (two beams in this example) represented by the beam pair index, to the power difference comparator 16. In this manner, two neighboring beams, which provide the largest channel response power sum, are selected from a plurality of beams (four beams in this example).

The power difference comparator 16 detects the difference between respective channel response powers of the two selected beams, and outputs information as to whether the difference is lower than a predetermined threshold to the single/multi-beam selector 17. That is, the power difference comparator 16 receives a beam pair index and respective power estimates of a plurality of beams represented by the beam pair index, compares the difference between the received power estimates with a predetermined threshold, and outputs the compared result to the single/multi-beam selector 17.

The single/multi-beam selector 17 selects the two beams if the power difference calculated by the power difference comparator 16 is lower than the predetermined threshold, and selects, as a single beam for use, only the one of the two beams, which has a larger power than the other, if the power difference is equal to or greater than the predetermined threshold. That is, the single/multi-beam selector receives the compared result of the difference between the power estimates of the plurality of beams represented by the beam pair index, selects a single beam or multiple beams of the plurality of beams according to the compared result, and outputs a beam index, corresponding to the selected beam or beams, to the antenna 10 through the switch 11. The antenna 10 sends the beam index to the base station 2.

Referring to FIG. 11, the base station 2 performs error correction encoding and modulation signal point mapping of transmission data randomizes the order of data transmission through the interleaver 23, and space-time encodes the signal output from the interleaver 23 with the orthogonal space-time coding matrix of two rows and two columns described above. Next, the base station 2 allocates the space-time coded signal to one beam or multiple beams represented by a selected beam index received from the mobile station 1.

As illustrated in FIG. 12, beam forming is performed on two space-time coded streams $[s_1, -s_2^*]$ and $[s_2, s_1^*]$, respectively, by beam-steering vectors 1201 and 1202 of two beams between which a user is located. If $b_1$ and $b_2$ denote beam indices of the two beams, the beam steering vector for $s_1$ and $-s_2^*$ can be expressed by Equation 10, and the beam steering vector for $s_2$ and $s_1^*$ can be expressed by Equation 11. That is, the beam forming is performed on the two streams $[s_1, -s_2^*]$ and $[s_2, s_1^*]$, respectively, by the beam steering vectors 1201 and 1202 of Equations 10 and 11, after which the streams are multiplexed $$W_{b1}=[W_{b1}^1, W_{b1}^2, W_{b1}^{Na}]^T \quad (10)$$

$$W_{b2}=[W_{b2}^1, W_{b2}^2, W_{b2}^{Na}]^T \quad (11)$$

A signal expressed by Equation 12 is output at a first time and a signal expressed by Equation 13 is output at a second time.

$$V_1=S_1W_{b1}+S_2W_{b2}=[V_1^1, V_1^2, V_1^{Na}]^T \quad (12)$$

$$V_1=-S_2^*W_{b1}+S_1^*W_{b2}=[V_2^1, V_2^2, V_2^{Na}]^T \quad (13)$$

The elements of the output signal V correspond respectively to the antenna branches.

An output signal $V_1^{iA}$ is obtained through each antenna branch at the first time, and an output signal $V_2^{iA}$ is obtained through each antenna branch at the second time. These output signals $V_1^{iA}$ and $V_2^{iA}$ are serial-to-parallel converted, and then spread respectively with spreading codes $c_1$ and $c_2$ at an antenna branch #iA, which are then multiplexed at the same spreading segment.

It is assumed that beams are assigned to groups A and B as shown in a beam pair classification table in FIG. 7. For example, if spreading codes, having a spreading factor twice the time-domain spreading factor, are allocated to a pilot signal, beams used by the same group are allocated spreading codes corresponding to leaves generated respectively from one set of nodes among a plurality of nodes having the same time domain spreading factor (see "Z" in FIG. 7) in a Walsh spreading code tree illustrated in FIG. 7.

Because the spreading codes having the spreading factor twice the above time domain spreading factor are allocated to the pilot signals, 16-bit spreading codes 1' to 4' are allocated to pilot signals other than signals for users of the groups A and B.

At each spreading segment, Walsh codes are used to perform two-dimensional spreading in both the time domain and the frequency domain. Here, spreading codes, which can be used according to a beam pair as illustrated in FIG. 7, are used.

The symbols are multiplexed with signals of the other users obtained in the same manner. At each subcarrier in the two-dimensional spreading segment, pilot signals are spread using a plurality of spreading codes orthogonal to spreading codes for user signals, and then the pilot signals are multiplexed with the user signals.

A frame signal (see FIG. 8) generated in this manner is converted to a time domain signal through Inverse Fast Fourier Transform (IFFT). A guard interval (GI) is added to the time domain signal, which is up-converted to a carrier frequency and then transmitted simultaneously from all antennas of the transmit antenna array 20 (see a beam pattern of fixed multiple beams shown in FIG. 9).

The mobile station 1 (or the receiving side) converts received signals to received subcarrier signals through fast Fourier transform. The received subcarrier signals are time-despread using spreading codes at each subcarrier, to which pilot signals for beams are allocated. Pilot signal modulation components are removed from the despread signals to obtain channel estimates from the beams.

The received signals are time-despread using spreading codes allocated to the user to suppress signal components causing interference. Then, the signals are space-time decoded, and the decoded signals are combined in the frequency domain. The despread signals are deinterleaved and then error-correction decoded to obtain a reproduced bit sequence.

As is apparent from the description above, a beamspace-time transmit diversity system according to the second embodiment of the present invention has the following advantages. In a transmission scheme, in which a transmit multibeam array is used in conjunction with space-time encoding in an OFDM-CDM system employing two-dimensional spreading, a transmitting side performs spreading code allocation to enable a receiving side to suppress signals that cause interference when space-time codes are decoded, through time-domain despreading. This prevents interference, and also to decrease interference between codes due to frequency selectivity.

In addition, because a plurality of space-time coded symbols in the time domain are spread using a plurality of spreading codes and then multiplexed in the same spreading segment, there is little influence of time variation caused by Doppler frequency. Accordingly, it is possible to improve transmission characteristics and system performance.

Further, in the beamspace-time transmit diversity system according to the second embodiment, a spatial domain signal output from a space-time encoder is allocated to the beamspace. As a result, if users are separately located appropriately in multiple beams, all multiplexed signals do not arrive at each mobile station, but only signals of users, who share a beam with the mobile station, arrives at the mobile station. Therefore, it is possible to decrease the number of arriving user signals and decrease interference between codes.

The conventional system uses a plurality of spreading areas for time-domain signals output from the space-time encoder. However, the system according to the second embodiment allocates the time domain signals output from the space-time encoder to a plurality of spreading codes and multiplexes the signals in the same spreading area, thereby increasing resistance to time variation of channels.

More specifically, the beamspace-time transmit diversity system according to the second embodiment decreases interference between codes caused by frequency selectivity of channels, and interference between codes caused by time variation of channels, and also prevents degradation of the decoding characteristics of space-time codes.

Further, in the beamspace-time transmit diversity system according to the second embodiment, orthogonal pilot signals are allocated to beams, or pilot signals are multiplexed after being spread with orthogonal spreading codes. Therefore, the receiving side can estimate a channel response from each beam. By calculating the power of the channel response estimate, it is possible to know the range of beams where the mobile station is located.

Moreover, because the base station allocates space-time coded signals, encoded with an orthogonal space-time coding matrix of two rows and two columns, to two neighboring beams or a single beam, the receiving side calculates the sum of powers of the channel estimates from neighboring beams to detect a beam-pair index representing two neighboring beams that provide the largest beam-pair power sum.

Further, if the difference between channel response powers from two selected beams is large, one of the two beams having the lower power may not be effectively utilized. As a result, only the other beam having the higher power is selected as a single beam for use, and the beam selection information is sent to the base station in the uplink. This enables the base station to identify an effective beam to assign to each mobile station.

However, in the conventional spreading code allocation scheme, user signals that share a common beam and use different beam pairs may interfere when space-time codes are decoded. To overcome this problem, spreading codes generated from different branches in a spreading code generation tree are allocated in the manner as described above, taking into consideration that the spreading codes generated from the different branches in the spreading code generation tree have zero partial correlation according to spreading factors of the different branches. Such spreading code allocation enables the receiver to suppress interfering user signals through time-domain despreading, thereby causing no interference when space-time codes are decoded.

Further, codes of a two-dimensional spreading factor branched from different branches in the time domain spreading factor may be allocated, as two spreading codes, to the same user. This makes it possible to separate signals through time domain despreading, thereby realizing space-time encoding.

In addition, in the spreading code allocation, different sets of spreading codes branched from different branches in the time domain spreading factor are preferably allocated to a plurality of users that use the same beam pair. This enables the receiver to suppress signals of the other users through time-domain despreading. Accordingly, it is possible to prevent interference between spreading codes during frequency domain combination.

Each of the transmitters and receivers in the mobile and base stations 1 and 2 includes a computer system therein. Procedures for performing the above system's operations, such as space-time encoding, the space-time decoding, and the beam index selection, are stored in the form of a program in a computer-readable recording medium. The computer can perform the operations by reading the program stored in the medium.

For example, to operate or implement each processing means or element in the transmitters and receivers of the mobile and base stations 1 and 2 described above, a central processing unit (CPU) in each of the transmitters and receivers reads the program from a main memory such as a ROM or a RAM to perform processing and calculation of information of the program.

The computer-readable recording medium includes a magnetic disk, a magneto-optical disk, a CD-ROM, a DVD-ROM, a semiconductor memory. Such a program may also be transmitted to the computer via a communication line, enabling the computer to execute the transmitted program.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. A transmit diversity system comprising:
a transmitter for allocating a signal to a beamspace of multiple beams, and transmitting the multiple beams;
a receiver for receiving the multiple beams and obtaining a channel estimate of each of the multiple beams;
first selection means for selecting a beam pair from a plurality of beam pairs of the multiple beams, said beam pair having a largest sum of powers of respective channel estimates of two beams included in said beam pair; and
second selection means for selecting one of the two beams included in the selected beam pair, if a difference between the powers of the respective channel estimates of the two beams is larger than a predetermined value.

2. The system according to claim 1, wherein a power of a channel estimate of said one of the two beams is larger than a power of a channel estimate of the other beam of the two beams.

3. A transmit diversity system comprising:
a transmitter for space-time encoding a signal for transmission into a space-time coded signal, performing time domain spreading and frequency domain spreading of the space-time coded signal to produce a spread signal, and transmitting the spread signal after allocating the spread signal to a beamspace of multiple beams; and
a code allocation means for allocating spreading codes having a partial correlation of 0 in the time domain spreading, if a single beam used by a user is included in multiple beams used by another user or if one of multiple beams used by the user is used by the another user.

4. The system according to claim 3, wherein the code allocation means additionally allocates spreading codes having a partial correlation of 0 in the time domain spreading to a plurality of users that use a same beam pair.

5. A receiver for receiving a signal allocated to a beamspace of multiple beams and obtaining a channel estimate of each of the multiple beams, said receiver comprising:
first selection means for selecting a beam pair from a plurality of beam pairs of the multiple beams, said beam pair having a largest sum of powers of respective channel estimates of two beams included in said beam pair; and
second selection means for selecting one of the two beams included in the selected beam pair, if a difference between the powers of the respective channel estimates of the two beams is larger than a predetermined value.

6. A transmitter for receiving a channel estimate from a receiver for receiving a signal allocated to a beamspace of multiple beams and obtaining a channel estimate of each of the multiple beams, said transmitter comprising:
first selection means for selecting a beam pair from a plurality of beam pairs of the multiple beams, said beam pair having largest sum of powers of respective channel estimates of two beams included in said beam pair; and
second selection means for selecting one of the two beams included in the selected beam pair, if a difference between the powers of the respective channel estimates of the two beams is larger than a predetermined value.

7. A transmitter for space-time encoding a signal for transmission into a space-time coded signal, performing time domain spreading and frequency domain spreading of the space-time coded signal to produce a spread signal, and transmitting the spread signal after allocating the spread signal to a beamspace of multiple beams, said transmitter comprising:
a code allocation means for allocating spreading codes having a partial correlation of 0 in a time domain spreading, if a single beam used by a user is included in multiple beams used by another user or if one of multiple beams used by the user is used by another user.

8. The transmitter according to claim 7, wherein the code allocation means additionally allocates the spreading codes having the partial correlation of 0 in the time domain spreading to a plurality of users that use a same beam pair.

9. A beam selection method in a transmit diversity system including a transmitter for allocating a signal to a beamspace of multiple beams, and transmitting the multiple beams and a receiver for receiving the multiple beams and obtaining a channel estimate of each of the multiple beams, said method comprising the steps of:
a) selecting a beam pair from a plurality of beam pairs of the multiple beams, said beam pair having s largest sum of powers of respective channel estimates of two beams included in said beam pair; and
b) selecting one of the two beams included in the selected beam pair, if a difference between the powers of the respective channel estimates of the two beams is larger than a predetermined value.

10. The method according to claim 9, wherein a power of a channel estimate of said one of the two beams is larger than a power of a channel estimate of the other beam of the two beams.

11. A spreading code allocation method in a transmit diversity system including a transmitter for space-time encoding a signal for transmission into a space-time coded signal, performing time domain spreading and frequency domain spreading of the space-time coded signal to produce a spread signal, and transmitting the spread signal after allocating the spread signal to a beamspace of multiple beams, said method comprising the step of:
allocating spreading codes having a partial correlation of 0 in the time domain spreading, if a single beam used by a user is included in multiple beams used by another user, or if one of multiple beams used by the user is used by the another user.

12. A spreading code allocation method in a transmit diversity system including a transmitter for space-time encoding a signal for transmission into a space-time coded signal, performing time domain spreading and frequency domain spreading of the space-time coded signal to produce a spread signal, and transmitting the spread signal after allocating the spread signal to a beamspace of multiple beams, said method comprising the step of:
allocating spreading codes having a partial correlation of 0 in the time domain spreading to a plurality of users that use a same beam pair.

13. A recording medium containing a beam selection program for enabling a receiver to perform a beam selection method in a transmit diversity system, said receiver receiving a signal allocated to a beamspace of multiple beams and obtaining a channel estimate of each of the multiple beams, said method comprising the steps of:
selecting a beam pair from a plurality of beam pairs of the multiple beams, said beam pair having a largest sum of powers of respective channel estimates of two beams included in said beam pair; and selecting one of the two beams included in the selected beam pair, if a difference between the powers of the respective channel estimates of the two beams is larger than a predetermined value.

14. A recording medium containing a beam selection program for enabling a transmitter to perform a beam selection method in a transmit diversity system, said transmitter receiving a channel estimate from a receiver for receiving a signal allocated to a beamspace of multiple beams and obtaining a channel estimate of each of the multiple beams, said method comprising the steps of:
   selecting a beam pair from a plurality of beam pairs of the multiple beams, said beam pair having a largest sum of powers of respective channel estimates of two beams included in said beam pair; and
   selecting one of the two beams included in the selected beam pair, if a difference between the powers of the respective channel estimates of the two beams is larger than a predetermined value.

15. A recording medium including a spreading code allocation program for enabling a transmitter to perform a spreading code allocation method in a transmit diversity system, said transmitter space-time encoding a signal for transmission into a space-time coded signal, performing time domain spreading and frequency domain spreading of the space-time coded signal to produce a spread signal, and transmitting the spread signal after allocating the spread signal to a beamspace of multiple beams, said method comprising the step of:
   allocating spreading codes having a partial correlation of 0 in the time domain spreading, if a single beam used by a user is included in multiple beams used by another user, or if one of multiple beams used by the user is used by another user.

16. The medium according to claim 15, wherein said method further comprises the step of allocating the spreading codes having the partial correlation of 0 in the time domain spreading to a plurality of users that use a same beam pair.

17. A transmit diversity system comprising:
   a transmitter for space-time encoding a signal for transmission into a space-time coded signal, performing time domain spreading and frequency domain spreading of the space-time coded signal to produce a spread signal, and transmitting the spread signal after allocating the spread signal to a beamspace of multiple beams;
   a beam allocation means for allocating a space-time coded signal in a spatial domain to a plurality of beams of the multiple beams; and
   a spreading code allocation means for allocating a space-time coded signal in a time domain to a plurality of spreading codes in a same spreading area.

18. The system according to claim 17, wherein the beam allocation means selects a beam pair from a plurality of beam pairs of the multiple beams received by a receiver, said beam pair having a largest sum of powers of respective channel estimates of two beams included in said beam pair, and, if a difference between the powers of the respective channel estimates of the two beams is larger than a predetermined value, the beam allocation means selects one of the two beams and allocates the space-time coded signal of the spatial domain to said one of the two beams.

19. The system according to claim 18, wherein the spreading code allocation means classifies the beam pair selected by the beam allocation means into beam pair groups in such a manner that beam pairs, which do not interfere with each other, are classified into a same beam pair group and beam pairs, which interfere with each other, are classified into different beam pair groups, and the spreading code allocation means allocates spreading codes of a two-dimensional spreading factor to the different beam pair groups, said spreading codes being branched from different branches in a time-domain spreading layer of a spreading code tree.

20. The system according to claim 18, wherein the spreading code allocation means allocates spreading codes of a two-dimensional spreading factor to said one of the two beams selected by the beam allocation means, said spreading codes being branched from the different branches in the time-domain spreading layer of the spreading code tree.

21. The system according to claim 17, wherein the spreading code allocation means allocates spreading codes having a partial correlation of 0 in a same spreading area, if a single beam used by a user is included in multiple beams used by another user, or if one of multiple beams used by the user is used by another user.

22. A transmit diversity method in a transmit diversity system comprising a transmitter for space-time encoding a signal for transmission into a space-time coded signal, performing time domain spreading and frequency domain spreading of the space-time coded signal to produce a spread signal, and transmitting the spread signal after allocating the spread signal to a beamspace of multiple beams, said method comprising the steps of:
   a) allocating a space-time coded signal in a spatial domain to a plurality of beams of the multiple beams; and
   b) allocating a space-time coded signal in a time domain to a plurality of spreading codes in a same spreading area.

23. The method according to claim 22, wherein, if a difference between powers of respective channel estimates of two beams corresponding to a beam pair selected from a plurality of beam pairs of the multiple beams received by a receiver, said beam pair having a largest sum of powers of respective channel estimates of two beams included in said beam pair, is larger than a predetermined value, one of the two beams included in the selected beam pair is selected, and the space-time coded signal of the spatial domain is allocated to said one of the two beams.

24. The method according to claim 23, wherein spreading codes having a partial correlation of 0 in the same spreading area are allocated, if a single beam used by a user is included in multiple beams used by another user, or if one of multiple beams used by the user is used by the another user.

25. The method according to claim 24, wherein said beam pair having the largest sum of powers is classified into beam pair groups in such a manner that beam pairs, which do not interfere with each other, are classified into the same beam pair group and beam pairs, which interfere with each other, are classified into different beam pair groups, and spreading codes of a two-dimensional spreading factor are allocated to the different beam pair groups, said spreading codes being branched from different branches in a time-domain spreading layer of a spreading code tree.

26. The method according to claim 24, wherein spreading codes of a two-dimensional spreading factor are allocated to said one of the two beams selected by the beam allocation means, said spreading codes being branched from different branches in a time-domain spreading layer of a spreading code tree.

27. The method according to claim 23, wherein said beam pair having the largest sum of powers is classified into beam pair groups in such a manner that beam pairs, which do not interfere with each other, are classified into the same beam pair group and beam pairs, which interfere with each other, are classified into different beam pair groups, and spreading codes of a two-dimensional spreading factor are allocated to the different beam pair groups, said spreading codes being branched from different branches in a time-domain spreading layer of a spreading code tree.

28. The method according to claim 23, wherein spreading codes of a two-dimensional spreading factor are allocated to said one of the two beams selected by the beam allocation means, said spreading codes being branched from different branches in a time-domain spreading layer of a spreading code tree.

29. The method according to claim 22, wherein spreading codes having a partial correlation of 0 in the same spreading area are allocated, if a single beam used by a user is included in multiple beams used by another user, or if one of multiple beams used by the user is used by the another user.

30. The method according to claim 29, wherein said beam pair having the largest sum of powers is classified into beam pair groups in such a manner that beam pairs, which do not interfere with each other, are classified into the same beam pair group and beam pairs, which interfere with each other, are classified into different beam pair groups, and spreading codes of a two-dimensional spreading factor are allocated to the different beam pair groups, said spreading codes being branched from different branches in a time-domain spreading layer of a spreading code tree.

31. The method according to claim 29, wherein spreading codes of a two-dimensional spreading factor are allocated to said one of the two beams selected by the beam allocation means, said spreading codes being branched from different branches in a time-domain spreading layer of a spreading code tree.

32. A recording medium including a communication program for enabling a transmit diversity system to perform a transmit diversity method, said transmit diversity system including a transmitter for space-time encoding a signal for transmission into a space-time coded signal, performing time domain spreading and frequency domain spreading of the space-time coded signal to produce a spread signal, and transmitting the spread signal after allocating the spread signal to a beamspace of multiple beams, said method comprising the steps of:

a) allocating a space-time coded signal in a spatial domain to a plurality of beams of the multiple beams; and b) allocating a space-time coded signal in a time domain to a plurality of spreading codes in a same spreading area.

33. The medium according to claim 32, wherein, in the method, if a difference between powers of respective channel estimates of two beams included in a beam pair selected from a plurality of beam pairs of the multiple beams received by a receiver, said beam pair having a largest sum of powers of respective channel estimates of two beams included in said beam pair, is larger than a predetermined value, one of the two beams included in the selected beam pair is selected, and the space-time coded signal of the spatial domain is allocated to said one of the two beams.

34. The medium according to claim 33, wherein, in the method, spreading codes having a partial correlation of 0 in the same spreading area are allocated, if a single beam used by a user is included in multiple beams used by another user, or if one of multiple beams used by the user is by the another user.

35. The medium according to claim 33, wherein, in the method, said beam pair having the largest sum of powers is classified into beam pair groups in such a manner that beam pairs, which do not interfere with each other, are classified into a same beam pair group and beam pairs, which interfere with each other, are classified into different beam pair groups, and spreading codes of a two-dimensional spreading factor are allocated to the different beam pair groups, said spreading codes being branched from different branches in a time-domain spreading layer of a spreading code tree.

36. The medium according to claim 33, wherein, in the method, spreading codes of a two-dimensional spreading factor are allocated to said one of the two beams selected by the beam allocation means, said spreading codes being branched from different branches in a time-domain spreading layer of a spreading code tree.

37. The medium according to claim 32, wherein, in the method, spreading codes having a partial correlation of 0 in the same spreading area are allocated, if a single beam used by a user is included in multiple beams used by another user, or if one of multiple beams used by the user is used by the another user.

38. The medium according to claim 37, wherein, in the method, said beam pair having the largest sum of powers is classified into beam pair groups in such a manner that beam pairs, which do not interfere with each other, are classified into a same beam pair group and beam pairs, which interfere with each other, are classified into different beam pair groups, and spreading codes of a two-dimensional spreading factor are allocated to the different beam pair groups, said spreading codes being branched from different branches in a time-domain spreading layer of a spreading code tree.

39. The medium according to claim 37, wherein, in the method, spreading codes of a two-dimensional spreading factor are allocated to said one of the two beams selected by the beam allocation means, said spreading codes being branched from different branches in a time-domain spreading layer of a spreading code tree.

* * * * *